United States Patent [19]

Harasawa et al.

[11] Patent Number: 5,304,940
[45] Date of Patent: Apr. 19, 1994

[54] UNWANTED SIGNAL SUPPRESSION DEVICE

[75] Inventors: Yasuhiro Harasawa; Tetsuo Kirimoto; Yoshimasa Oh-Hashi, all of Kanagawa, Japan

[73] Assignee: Mitsubishi Denki Kabushiki Kaisha, Tokyo, Japan

[21] Appl. No.: 901,566

[22] Filed: Jun. 19, 1992

[30] Foreign Application Priority Data

Jun. 28, 1991 [JP] Japan .................... 3-158007

[51] Int. Cl.$^5$ .................... H04K 3/00; H03K 13/00
[52] U.S. Cl. .................... 328/167; 307/521; 364/724.01
[58] Field of Search ............... 328/165, 167; 307/520, 307/521; 364/724

[56] References Cited

U.S. PATENT DOCUMENTS

| 4,091,236 | 5/1978 | Chen | 328/167 |
| 4,349,916 | 9/1982 | Roeder | 328/167 |
| 4,544,919 | 10/1985 | Gerson | 381/41 |
| 4,587,620 | 5/1986 | Niimi et al. | 328/167 |
| 4,695,970 | 9/1987 | Renner et al. | 364/724 |
| 4,719,649 | 1/1988 | Woodsum et al. | 342/14 |
| 4,939,473 | 7/1990 | Eno | 328/167 |

*Primary Examiner*—Timothy P. Callahan
*Attorney, Agent, or Firm*—Wolf, Greenfield & Sacks

[57] ABSTRACT

An unwanted signal suppression device is disclosed for suppressing unwanted signals in input signals containing desired and unwanted signals. The input signals are divided into segments in the time domain. The device includes a unit for detecting the segment having maximum power, a unit for computing reflection coefficients on the basis of the segments except the detected power segment, and a lattice filter for suppressing the unwanted signals by using the computed reflection coefficients. A second device includes a reflection coefficient computing unit, a median filter and a lattice filter. A third device includes a unit for estimating unwanted signals frequency, a filter for computing filter weights on the basis of the estimated frequency and filter coefficients and for applying the computed weights to the input signals so as to suppress the unwanted signals.

14 Claims, 26 Drawing Sheets

DOPPLER FREQUENCY

24a TARGET SIGNAL

24b TARGET SIGNAL

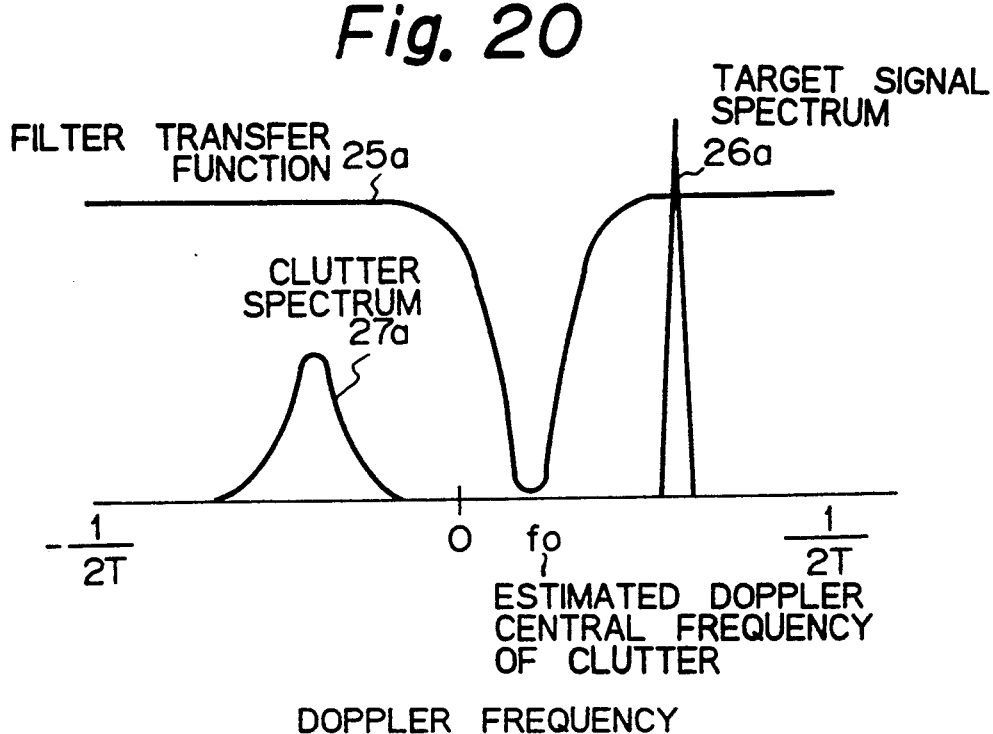
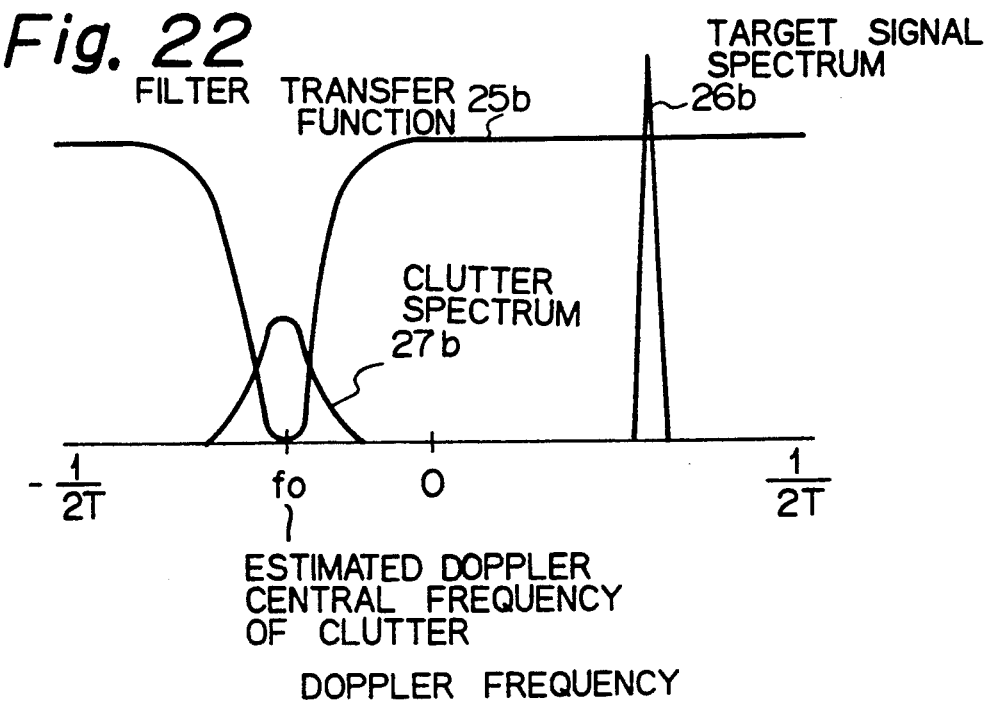

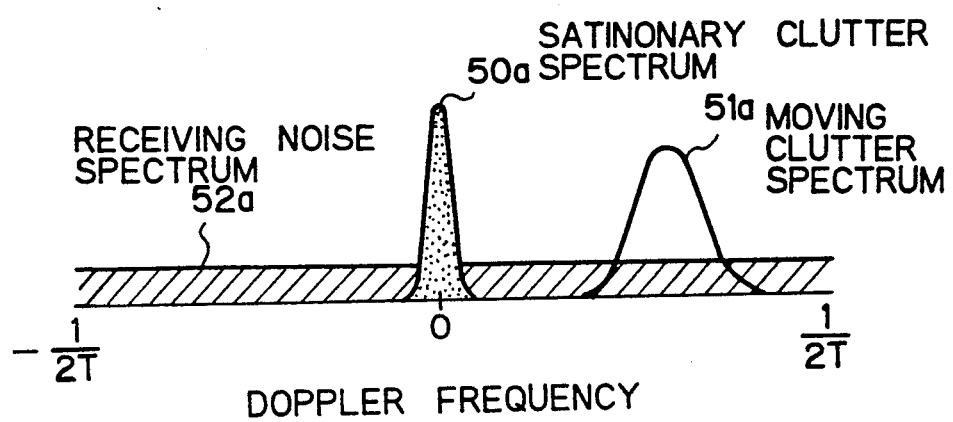
Fig. 25(a)
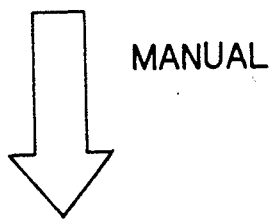
MANUAL MTI PROCESSING
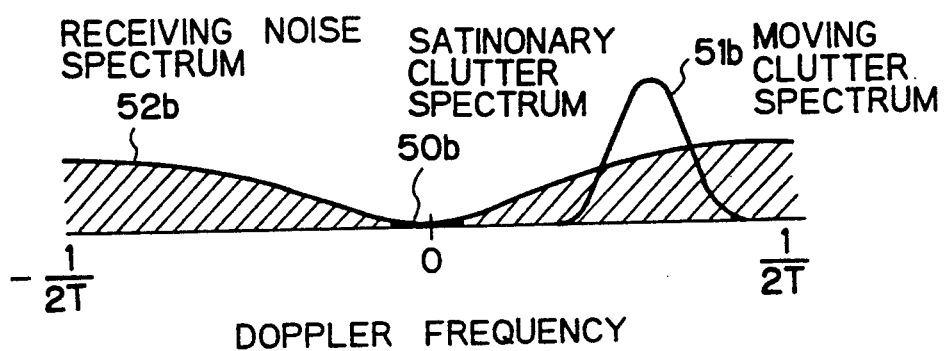
Fig. 25(b)

UNWANTED SIGNAL SUPPRESSION DEVICE

BACKGROUND OF THE INVENTION

1. Field of the Invention

The present invention relates to an unwanted signal suppression device using a filter such as a clutter suppression device for eliminating reflection echoes caused by clutter or the like of signals, except for signals of interest, which have been received by a plurality of lattice type filters (hereafter called lattice filter) connected in cascade, for example, in a pulse radar, and a clutter suppression device to cause the notch of a notch filter for removing reflection echoes by clutter or the like to adaptively follow the reflection echoes.

2. Description of the Prior Art

An example of the clutter suppression device for removing unwanted signals except for reflection echoes from the target signals such as clutter or the like which are received by a pulse radar is known, for example, from the article by Hideaki Watanabe et al. titled "Adaptive Clutter Suppression Device by Use of a Plurality of Segments MEM" published in the Proceedings of Electronic Information Communication Society, Vol. J70-B No. 4, pp. 515-523 (April 1987).

FIG. 1 is a block diagram of a circuit illustrating a constitution of a clutter suppression device according to a prior art. In FIG. 1, reference numerals 1a and 1b designate reflection coefficient computing means, reference numerals 2a and 2b delay elements, reference numerals 3a, 3b, 3c and 3d complex multipliers and reference numerals 4a, 4b, 4c and 4d complex adders. Symbols X(n), $f^m(n)$, $b^m(n)$, $P_m$ (n=1-3, m=1, 2) represent respectively the vector of the signals which are respectively expressed in the following equations. $P_m$ (m=1, 2) is reflection coefficient.

$$X(n)=[X_1(n),X_2(n),\ldots,X_k(n)]^T \quad (1a)$$

$$f^m(n)=[f_1{}^m(n),f_2{}^m(n),\ldots,f_k{}^m(n)]^T \quad (1b)$$

$$b^m(n)=[b_1{}^m(n),b_2{}^m(n),\ldots,b_k{}^m(n)]^T \quad (1c)$$

$$P_m=\text{diag}[\rho_1{}^m,\rho_2{}^m,\ldots,\rho_k{}^m] \quad (1d)$$

where T designates a transpose and diag [ ] designates the diagonal matrix.

Next are explained the definition of the suffix m, suffix k, suffix n and the respective signals which are used in the above notation of signals by referring to FIG. 2.

FIG. 2 is a diagram illustrating the timing relationship among the signals transmitted and received by the pulse radar, wherein reference numerals 5a, 5b and 5c designate the pulses of the transmission signals and reference numerals 6a, 6b and 6c designate the reception signals. The pulse radar generates therein a plurality of pulse electric waves having a pulse width of $\tau$ and emits these pulse electric waves to an external space in a constant pulse repetition period of T as transmission signals. The transmission signals are numbered in the sequential order of their emission to the outside. In FIG. 2, reference numeral 5a designates the first transmission signal, reference numeral 5b the second transmission signal and reference numeral 5c the n-th transmission signal.

The pulse radar receives a series of reception electric waves during the interval between transmissions of the pulse electric waves and converts them into electrical signals by means of the receiver installed therein and takes in these electrical signals as reception signals. These reception signals are also numbered in a similar manner to the case of said transmission signals and those numbers are referred to as pulse hit numbers. In FIG. 2, reference numeral 6a designates the first reception signal, reference numeral 6b the second reception signal and reference numeral 6c the n-th reception signal.

The pulse radar is adapted, after having executed phase detection of a series of reception electric waves and converting them into reception signals of base bands, to convert such reception signals into digital signals by sampling and quantitizing them. These digital signals retain the phase of the reception electric waves and are complex signals having the so-called I signal (in-phase) and Q signal (quadrature-phase) respectively at the real part and the imaginary part. Sampling of the signals is executed by use of the same timing for all of the reception signals as illustrated in FIG. 2. More specifically, after a delay of the time $\tau_d$ from the time of transmission of the transmission signals, sampling is executed in a constant cycle $\tau_s$ and the total number k of digital signals as expressed by $X_1(n), X_2(n), \ldots, X_k(n)$ are generated from one reception signal as shown in FIG. 2. It is to be noted here that n designates the pulse hit number and k designates the sequential order of sampling. K is called a range bin number.

The digital signals X(n) which have been obtained by the pulse radar as above explained are subsequently transferred as the input signals for the clutter suppression device and are referred to as input signals hereinbelow.

The suffix m represents stage numbers of the lattice filter as shown in FIG. 1.

Operation of a conventional device will next be explained by referring to FIG. 1. The input signal vector X(n) (n=1-3) transferred from the pulse radar is input to the lattice filter at the stage 1. At this time, the input signal X(n) is used as a forward prediction error signal vector $f^0(n)$ and a backward prediction error signal vector $b^0(n)$ as expressed in the equations 2a and 2b.

$$f^0(n)=X(n) \quad (2a)$$

$$b^0(n)=X(n) \quad (2b)$$

The lattice filter at the stage 1 generates signal vectors $f^1(n)$ and $b^1(n)$ from the signal vectors $f^0(n)$ and $b^0(n)$ in accordance with the equations 3a and 3b.

$$f^1(n)=f^0(n)+P_1 b_0(n-1) \quad (3a)$$

$$b^1(n)=b^0(n-1)+P_1 \cdot f_0(n) \quad (3b)$$

where n=2, 3 and * stands for complex conjugate.

In operation of the equations 3a and 3b, multiplication is executed by the complex multipliers 3a and 3b, addition is executed by the complex adders 4a and 4b and unit delay with respect to backward prediction signal vector $b^0(n)$ is executed by the delay element 2a.

At the same time, the reflection coefficient computing means 1a receives the vector $f^0(n)$ and the vector $b^0(n)$ to compute reflection coefficient $\rho_1$. Since the clutter suppression device according to a prior art will not suppress the target signals, when the i-th range bin is processed, a plurality of range bins equivalent to the number of NL and NR displaced respectively by $\Delta R$ from the i-th range excluding the i-th range bin are selected and used as the data for computing the reflection coefficient as illustrated in FIG. 3. This operation is executed under the assumption that the target signal is present only for one range bin while the clutter is present in a very wide range and that the power spectrum of the clutter will not suddenly change in its range.

The reflection coefficient vector $P_1$ is generated based on the following equations (4a) through (5b).

$$bf_i^0(n) = \qquad (4a)$$

$$[f_{i-\Delta R-NL}^0(n), \ldots, f_{i-\Delta R+1}^0(n), f_{i+\Delta R+1}^0(n), \ldots, f_{i+\Delta R+NL}^0(n)]^T$$

$$bb_i^0(n) = \qquad (4b)$$

$$[b_{i-\Delta R-NL}^0(n), \ldots, b_{i-\Delta R+1}^0(n), b_{i+\Delta R+1}^0(n), \ldots, b_{i+\Delta R+NL}^0(n)]^T$$

$$\rho_i^1 = \qquad (5a)$$

$$-2 \frac{\sum_{n=2}^{3} bf_i^0(n)^T \cdot bb_i^0(n-1)^*}{\sum_{n=2}^{3} \{bf_i^0(n)^T \cdot bf_i^0(n)^* + bb_i^0(n-1)^T \cdot bb_i^0(n-1)^*\}}$$

where $i = 1, 2, \ldots, k$ $$P_1 = \text{diag}\,[\rho_1^1, \rho_2^1, \ldots, \rho_k^1] \qquad (5b)$$

where k: total number of range bins
i: processing range bin number
NL: size of the data for computing reflection coefficient at the left side of the processing range bin
NR: size of the data for computing reflection coefficient at the right side of the processing range bin
ΔR: number of interval range bins between the processing range bin and the data for computing the reflection coefficient.

The algorithm for computing the reflection coefficient as expressed in the equation 5a is an application of the known Burg method and is the algorithm for minimizing the sum of square power of the forward prediction error signal vector $f^1(n)$ and the backward prediction error signal vector $b^1(n)$.

Then, the lattice filter at the stage 2 receives the prediction error signal vector $f^1(n)$ and $b^1(n)$ to generate signal vectors $f^2(n)$ and $b^2(n)$ based on the following equations 6a and 6b.

$$f^2(n) = f^1(n) + P_2 \cdot b^1(n-1) \qquad (6a)$$

$$b^2(n) = b^1(n-1) + P_2^* \cdot f^1(n) \qquad (6b)$$

where $n=3$.

In operation of the equations 6a and 6b, multiplication is executed by the complex multipliers 3c and 3d, addition is executed by the complex adders 4c and 4d, and unit delay applied to the signal vector $b^1(n)$ is executed by the delay element 2b.

Concurrently with this operation, the reflection coefficient computing means 1b receives the vectors $f^1(n)$ and $b^1(n)$ to generate the reflection coefficient vector $P_2$ necessary for the equations 6a and 6b in accordance with the following equations 7a through 8b.

$$bf_i^1(n) = \qquad (7a)$$

$$[f_{i-\Delta R-NL}^1(n), \ldots, f_{i-\Delta R+1}^1(n), f_{i+\Delta R+1}^1(n), \ldots, f_{i+\Delta R+NL}^1(n)]^T$$

$$bb_i^1(n) = \qquad (7b)$$

$$[b_{i-\Delta R-NL}^1(n), \ldots, b_{i-\Delta R+1}^1(n), b_{i+\Delta R+1}^1(n), \ldots, b_{i+\Delta R+NL}^1(n)]^T$$

$$\rho_i^1 = \qquad (8a)$$

-continued $$-2 \frac{\sum_{n=3}^{3} bf_i^1(n)^T \cdot bb_i^1(n-1)^*}{\sum_{n=3}^{3} \{bf_i^1(n)^T \cdot bf_i^1(n)^* + bb_i^1(n-1)^T \cdot bb_i^1(n-1)^*\}}$$

where $i = 1, 2, \ldots, k$ $$P_2 = \text{diag}\,[\rho_1^2, \rho_2^2, \ldots, \rho_k^2] \qquad (8b)$$

The algorithm for computing the reflection coefficient $P_2$ as expressed by the equation 8a and 8b is based on that of Burg method in the same manner as the equations 5a and 5b.

Lastly, the forward prediction error signal vector $f^2(3)$ at the stage 2 is taken out to the outside as an output signal from the clutter suppression device.

As explained above, the conventional clutter suppression device was intended to eliminate the clutter contained in the input signals by sequentially generating the forward prediction error signals and the backward prediction error signals from the input signals X(n) (provided n=1-3) and minimizing the square mean power of the output signals. This is equivalent to elimination of the intense spectrum component out of the Doppler spectrum contained in the input signal vectors X(1), X(2) and X(3). Under a normal electric wave environment, the more intense spectrum component(s) in the input signal is (are) the clutter spectrum. Thus, the clutter may be suppressed. In a circumstance wherein a large target is present at a rather short distance, the target signal power may be far larger than the clutter power. However, since the processing range bin i and the range bins including the data for computing the reflection coefficient (i.e., the range bins in the sizes NL and NR) are separated with each other, the target signals will not be suppressed.

FIGS. 4(a) and 4(b) illustrate the manner in which the clutter signals are suppressed. FIG. 4(a) illustrates a condition in which the clutter is present in a very wide range and the target signal exists in the processing range bin i, while FIG. 4(b) illustrates that the filter transfer function is generated in the above-mentioned condition so that the clutter spectrum 24 will be suppressed. In FIG. 4(b), reference numeral 23 designates a filter transfer function generated by the filter, reference numeral 23a a notch which is the suppressing part of the filter transfer function 23, reference numeral 24 the clutter spectrum, reference numeral 25 the target signal spectrum, reference numeral 27 null formed by the notch 23a, reference character W the width of the notch 23a, reference character D the depth of the notch 23a, reference character N the notch frequency of the notch 23a, and reference character X the range in which the clutter spectrum 24 has been suppressed by the null 27.

Thus, the null of the filter is caused by the range X to suppress the clutter. Namely, the reflection coefficient for the processing range bin i in which the target signal is present is computed by the data of the range bins inside NL and NR or the data of the clutter signal, such that the clutter may be suppressed.

Reference is next made to FIGS. 5(a) and 5(b) which illustrate the condition in which the target signal is present along with the clutter signals outside the processing range bin. FIG. 5(a) illustrates the condition in which the clutter signals are present in wide range bins while the target signal is present in the range bin i−3 included in NL. In this condition, since the target signal is included in NL, when the reflection coefficient of the processing range bin i is computed, null of the filter is generated for the frequency of the target signal as shown in FIG. 5(b), such that the clutter spectrum 24 will not be suppressed.

As shown in FIG. 3, since the conventional clutter suppression device separates the processing range bin i from the range bins (i.e., the range bins within NL and NR) having the data for computing the reflection coefficient for said processing bin, when a target signal of a large power is received, and if the range bins in which the target signal is present are to be processed, the null of the filter is generated for the clutter as shown in FIG. 4(b). However, in case of such a range as a target signal is included within the range bins (i.e., the range within NL and NR) having the data for use of computing the reflection coefficient shown in FIG. 3, the null is generated for the Doppler frequency of the target signal as shown in FIG. 5(b), resulting in an inability to suppress the clutter.

Furthermore, according to the conventional clutter suppression device, since the notch frequency N and the depth D of the notch of the filter for suppressing the clutter had to be controlled simultaneously, a sufficient number of data samples are required for converging a filter weight to an optimum value. Accordingly in such a radar system as a search radar in which only a few pulse bits obtained, the filter weight cannot be adequately converged, so that the notch frequency or the notch depth may be subject to variation resulting in incomplete clutter suppression.

SUMMARY OF THE INVENTION

The present invention has been proposed in order to eliminate the problems as above cited and an object of the present invention is to provide an unwanted signal suppression device in which a capability of suppressing unwanted signals from clutter or the like is not degraded due to the influence by target signals.

To achieve this object, an unwanted signal suppression device, according to the present invention, for suppressing unwanted signals in input signals which contain desired signals and unwanted signals, comprises;

a power detection means for computing a power for each signal segment which is produced by dividing said input signals by specified time intervals to detect at least the signal segment which exhibits the maximum power, a reflection coefficient computing means for computing reflection coefficients on the basis of the remaining signal segments excluding the detected signal segment exhibiting the maximum power, and a lattice filter for suppressing said unwanted signals on the basis of said input signals and said computed reflection coefficients to generate said desired signals.

Furthermore to achieve the object mentioned above, another unwanted signal suppression device, according to the present invention, for suppressing unwanted signals in input signals which contain desired signals and the unwanted signals, comprises;

a reflection coefficient computing means for computing reflection coefficients for each signal segment which is produced by dividing said input signals by specified time intervals, a median filter for extracting at least the maximum reflection coefficient out of said computed reflection coefficients to output the remaining reflection coefficients excluding said maximum reflection coefficient, and a lattice filter for suppressing said unwanted signals on the basis of said input signals and the reflection coefficients output from said median filter.

Another object of the present invention is to provide an unwanted signal suppression device which reduces incomplete suppression of unwanted signals from clutter or the like caused by variation of the notch frequency and the notch depth of a filter.

To achieve this object, an unwanted signal suppression device, according to the present invention, for suppressing unwanted signals in input signals which contain desired signals and the unwanted signals, comprises;

an unwanted signal frequency estimation means for estimating a frequency of said unwanted signals on the basis of said input signal, and a filter means for computing a filter weight on the basis of the frequency of said estimated unwanted signals and filter coefficients exhibiting a desired amplitude characteristic, and applying said computed filter weight to said input signals to suppress said unwanted signals and generate said desired signals.

These and other objects and advantages will become clear by reading the following description of the invention with reference to the accompanied drawings.

BRIEF DESCRIPTION OF THE DRAWINGS

FIG. 20 shows a frequency spectrum for explaining the operation of embodiment 4 of the present invention;

FIG. 22 shows a frequency spectrum for explaining the operation of embodiment 4 of the present invention;

FIGS. 25(a) and 25(b) illustrate frequency spectrums for explaining the operation of embodiment 6 of the present invention;

DESCRIPTION OF THE PREFERRED EMBODIMENTS

Embodiment 1

Figure 1:
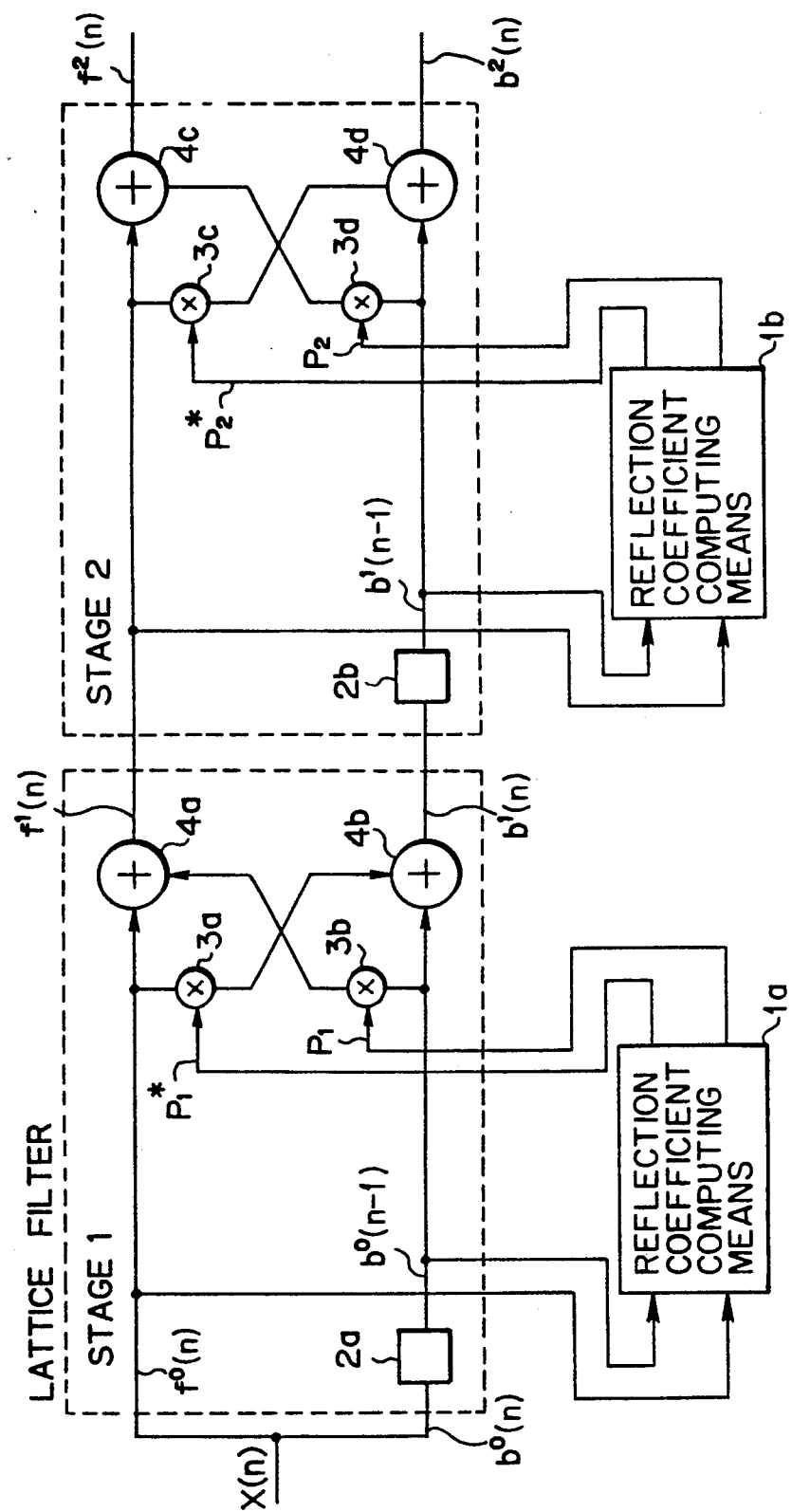
FIG. 1 is a block diagram illustrating a constitution of a clutter suppression device according to a prior art.
Figure 2:
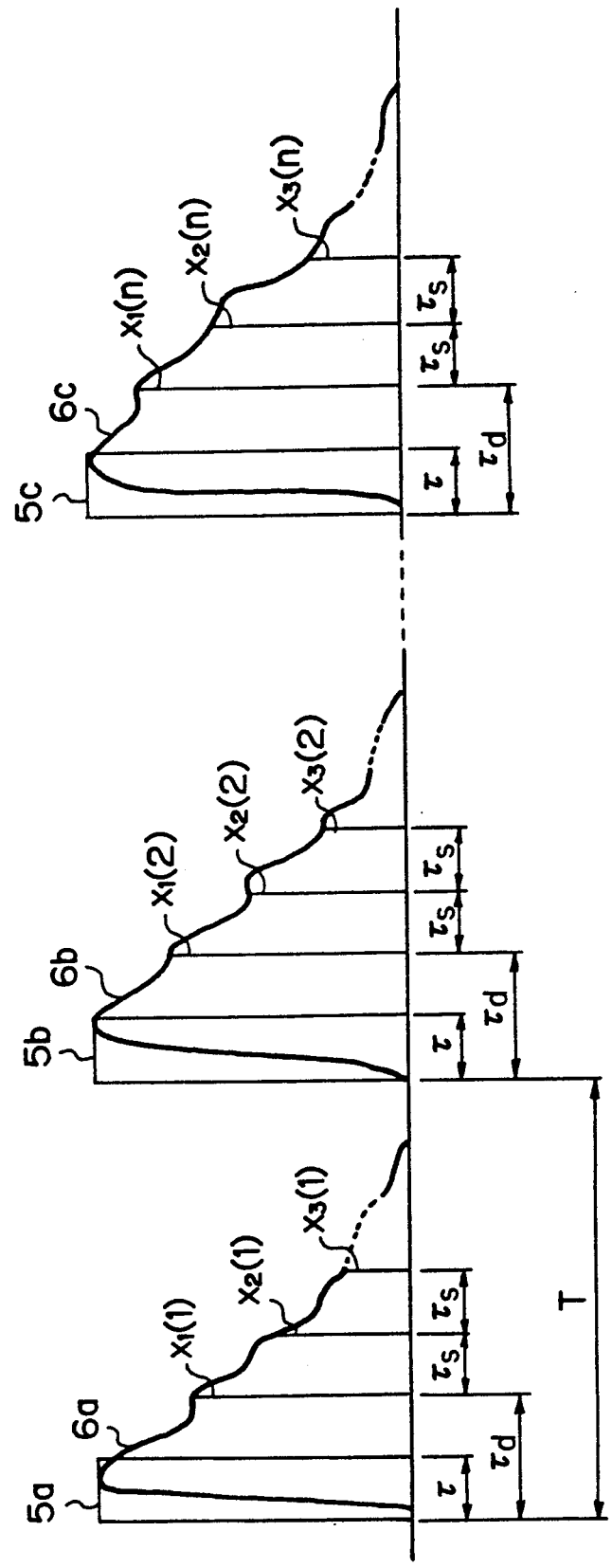
FIG. 2 is a signal waveform diagram showing a timing of transmission and reception by a pulse radar.
Figure 6:
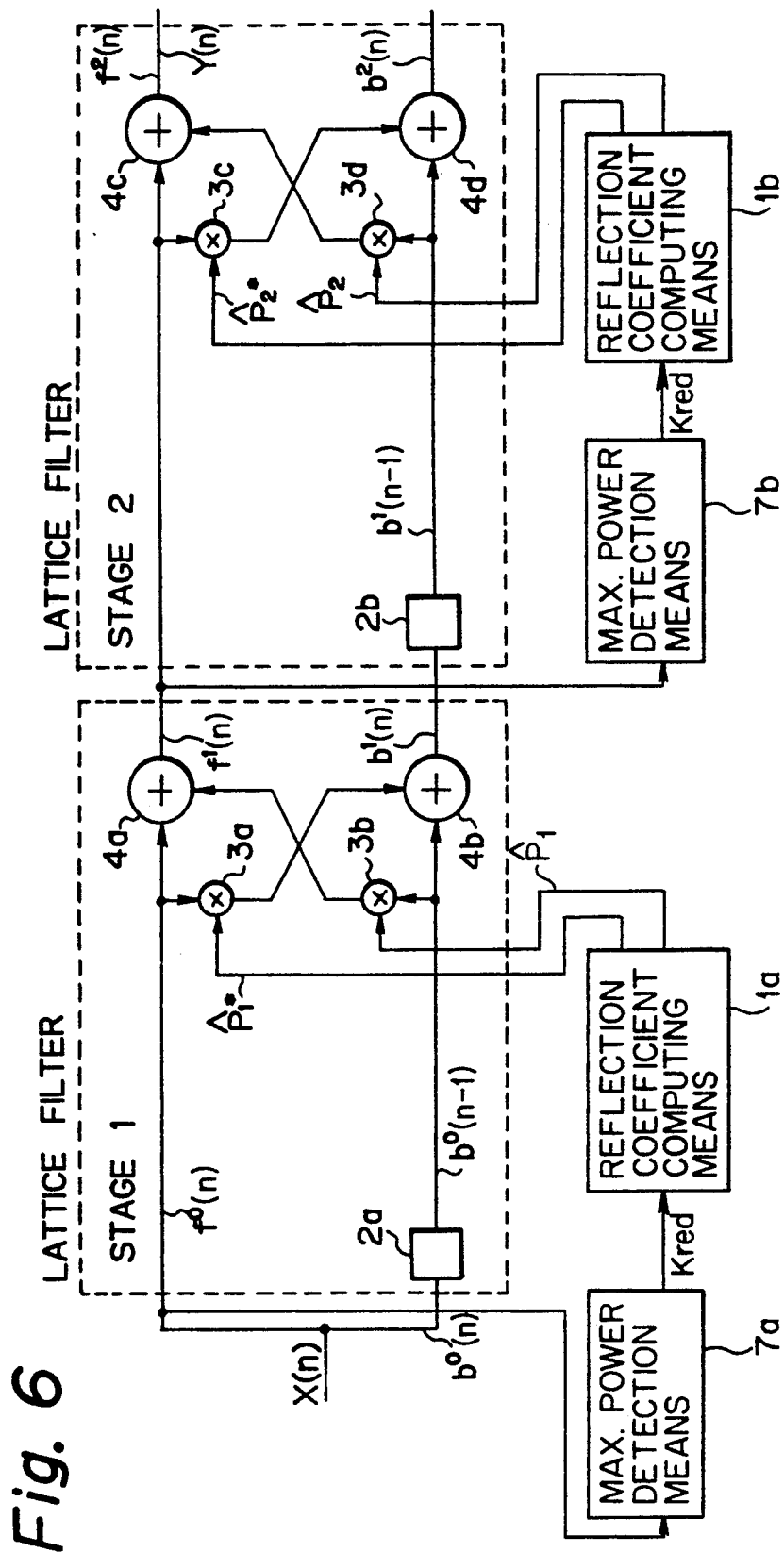
FIG. 6 is a block diagram illustrating embodiment 1 according to the present invention.

An embodiment of the first aspect of the present invention will now be explained with reference to the accompanying drawings. In FIG. 6, reference numerals 2 through 4 designate the identical elements to those employed in the conventional clutter suppression device as described above with reference to FIG. 1. The difference between the present invention and the conventional device is provision of maximum power detection means $7a$, $7b$ (an example of the power detection means) and reflection coefficient computing means $1a$, $1b$ for receiving the outputs of the maximum power detection means $7a$, $7b$ to compute the reflection coefficients in accordance with the value of those outputs, respectively.

Figure 7:
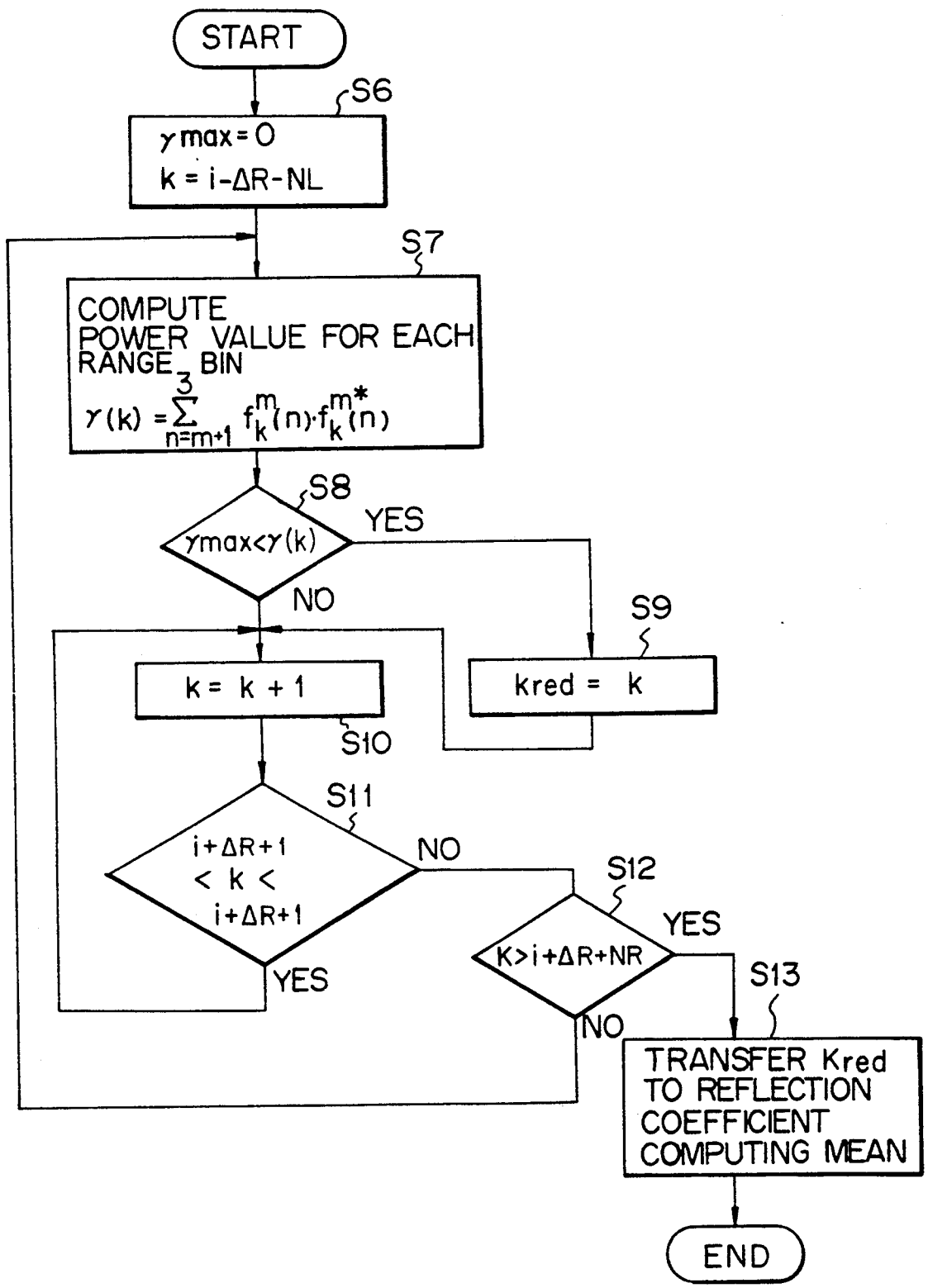
FIG. 7 is a flow chart illustrating the operation of a power comparison means.

Operation of the embodiment 1 of the present invention will now be explained. The operation executed by the maximum power detection means $7a$, $7b$ will be explained by referring to a flow chart in FIG. 7. The operations executed by the maximum power detection means $7a$ and $7b$ are equivalent but input signals are different. Accordingly, operation of the maximum power detection means $7a$ only will be explained for convenience of explanation.

Firstly when the range bin i is processed, at step S6, $\gamma_{max}$ which exhibits the max. power value is cleared and the minimum range bin number of the data to be read for computing the reflection coefficient is set to k. In accordance with the range bin number which has thus been set, the power value to be calculated by the following equation is computed in step S7 from the prediction error number $f_k^o(n)$.

$$\gamma(k) = \sum_{n=1}^{3} f_k^o(n) \cdot f_k^o(n)^* \qquad (9)$$

Figure 3:
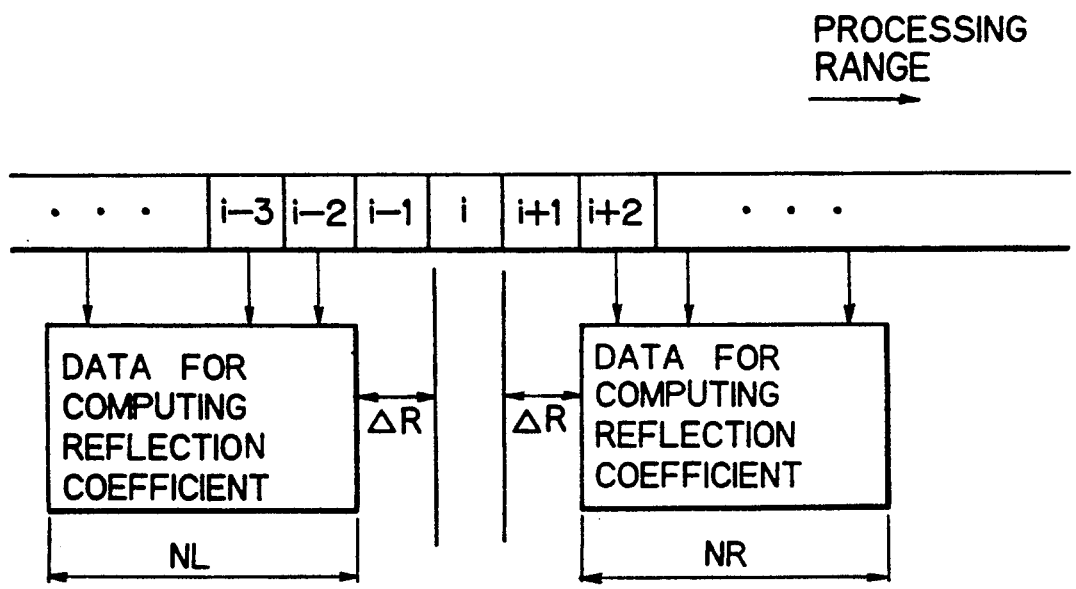
FIG. 3 illustrates a positional relationship between the processing range bin and the learning block for explaining an operation of the clutter suppression device according to a prior art.
Figure 4A:
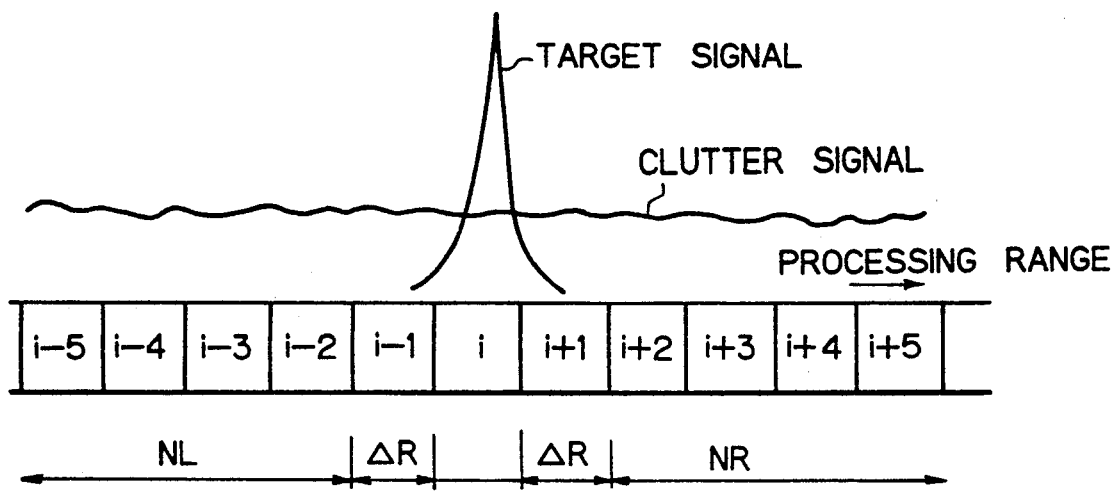
FIGS. 4(a) and 4(b) illustrate a frequency spectrum for explaining an operation of the clutter suppression device according to a prior art.
Figure 4B:
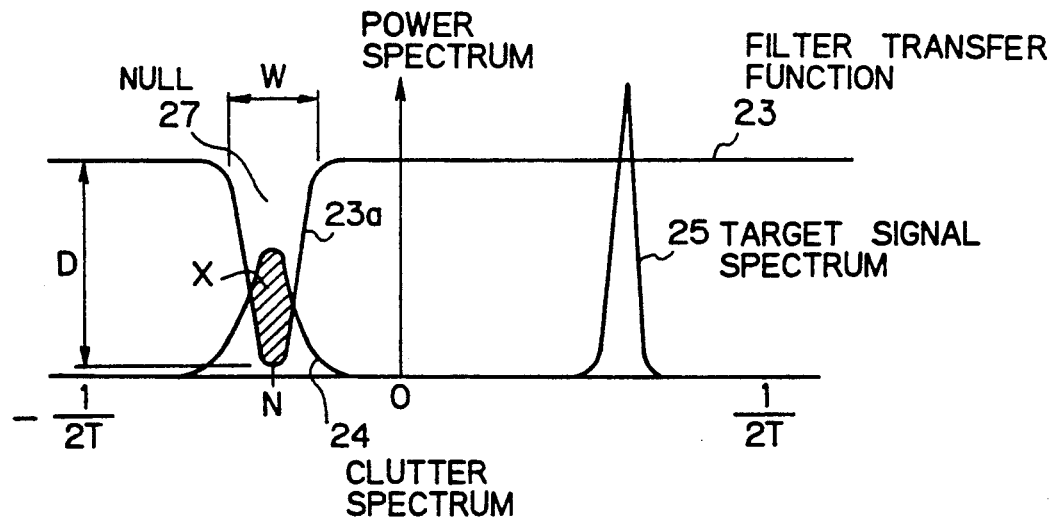
Figure 5A:
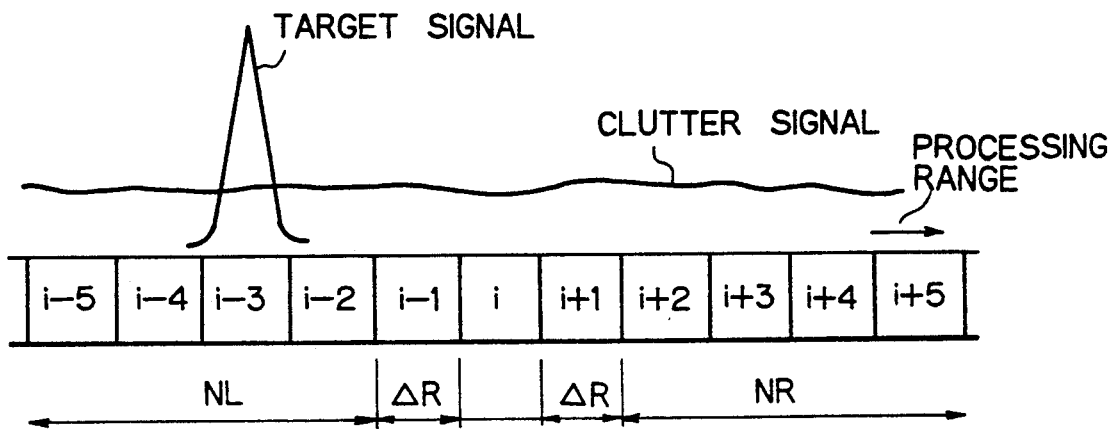
FIGS. 5(a) and 5(b) illustrate another frequency spectrum for explaining another operation of the clutter suppression device according to a prior art.
Figure 5B:
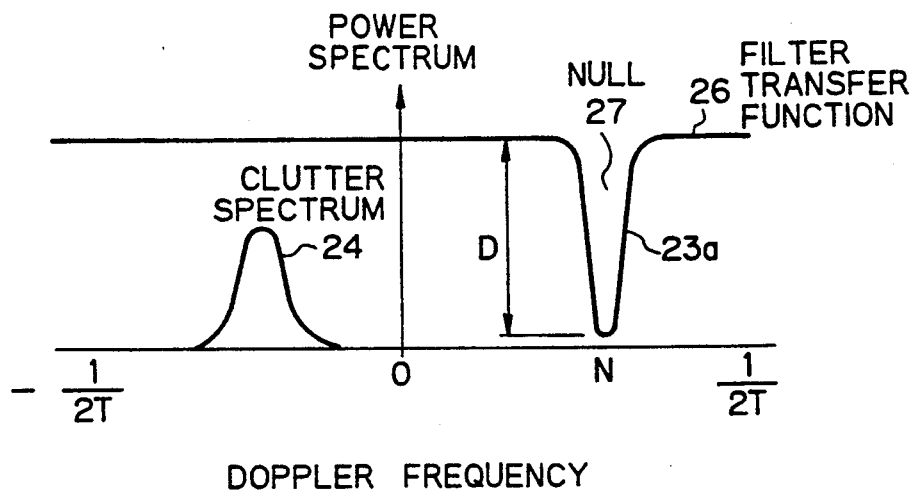

In step S8, $\gamma(k)$ which has been calculated in step S7 is decided to be if it is the maximum in the values which have been calculated so far. If so, the range bin number k is substituted for $k_{red}$ in step S9. Then in step S10, variable k is updated to compute the power of the next range bin data. At this time, the data for computing the lattice reflection coefficient are set at the opposite sides of the processing range i with the offset $\Delta R$ as shown in FIG. 3, so that, as the variable k is updated, the offset $\Delta R$ and the processing range i will be included in the data to be processed. Accordingly, a decision is made in step S11 in such a manner as those range bin data are not included. When the variable k exceeds $i + \Delta R + NR$, the data processing is finished at step S12. In step S13, the range bin number $k_{red}$ exhibiting the maximum power is transferred to the reflection coefficient computing means $1a$ in step S13. If there is a big target signal in the data for computing the reflection coefficient, that $k_{red}$ indicates the range bin number in which the target signal is present.

In the reflection coefficient computing means $1a$, the reflection coefficients are computed based on the equations 4a through 5b. The difference in such computation between the present invention and the prior art mentioned above is that computation is made without including the data corresponding to the range bin number $k_{red}$ transferred from the maximum power value detection means $7a$. For example, if $k_{red} = i + \Delta R + 1$, the lattice reflection coefficient is calculated by the following equations.

$$bf_i^0(n) = \qquad (10a)$$
$$[f_{i-\Delta R-NL}^0(n), \ldots, f_{i-\Delta R+1}^0(n), f_{i+\Delta R+2}^0(n), \ldots, f_{i+\Delta R+NL}^0(n)]^T$$

$$bb_i^0(n) = \qquad (10b)$$
$$[b_{i-\Delta R-NL}^0(n), \ldots, b_{i-\Delta R+1}^0(n), f_{i+\Delta R+2}^0(n), \ldots, b_{i+\Delta R+NL}^0(n)]^T$$

$$p_i^1 = \qquad (11)$$
$$-2 \frac{\sum_{n=2}^{3} bf_i^0(n)^T \cdot bb_i^0(n-1)^*}{\sum_{n=2}^{3} \{bf_i^0(n)^T \cdot bf_i^0(n)^* + bb_i^0(n-1)^T \cdot bb_i^0(n-1)^*\}}$$

where $i = 1, 2, \ldots, k$

Difference with the conventional clutter suppression device is in that in the equations 10a and 10b, terms regarding $i + \Delta R + 1$ are excluded from the respective terms of $f^o(n)$ and $b^o(n)$ included in the equations 4a and 4b. Result of the operation will be equivalent to the operation result of equation 12.

$$p_i^1 = -2 \frac{\sum_{n=2}^{3} \{bf_i^0(n)^T \cdot bb_i^0(n-1)^T - f_{kred}^0(n)^T \cdot b_{kred}^0(n)^*\}}{\sum_{n=2}^{3} \{bf_i^0(n)^T \cdot bf_i^0(n)^* + bb_i^0(n-1)^T \cdot bb_i^0(n-1)^*\}} \qquad (12a)$$

where $i = 1, 2, \ldots, k$
$P_2 = \text{diag}\,[\rho_1^1, \rho_2^2, \ldots, \rho_k^1]$ \qquad (12b)

Figure 8:
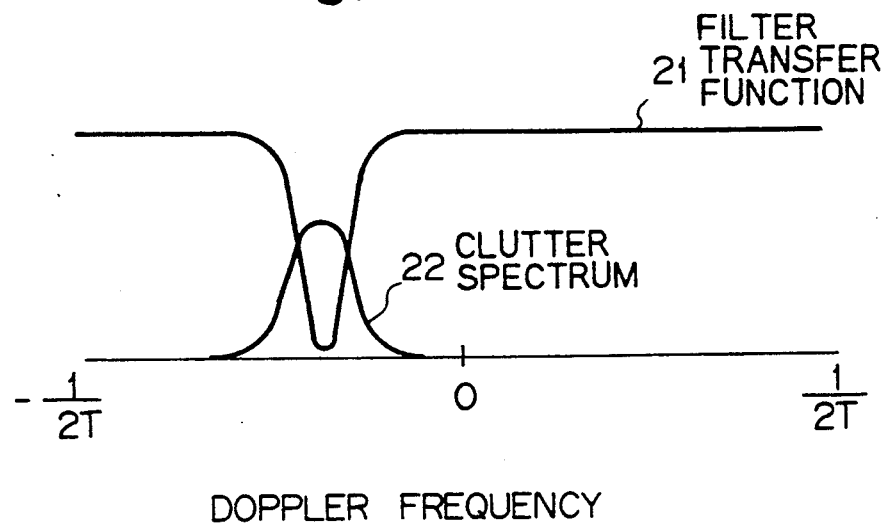
FIG. 8 shows a frequency spectrum for explaining the operation of embodiment 1 of the present invention.

According to the equations 10a through 11 or the equations 12a and 12b, since, (when the reflection coefficients are computed), the data relating to the target signals are not included in that computation but only information relating to the clutter is used, the lattice filter can form null for the clutter as shown in FIG. 8 whereby the clutter can be suppressed without being influenced by the target signals.

In the embodiment as above explained there has been shown a clutter suppression device for a pulse radar, having a plurality of lattice filters connected in cascade and adapted to eliminate the reflection signals reflected from a substance other than the target, such as clutter or the like received by the pulse radar, the clutter suppression device being characterized by including a maximum power detection means provided for each lattice filter and adapted to receive as the data signals which are obtained by branching off input signals input into the respective lattice filters, compute and compare the power value of the data for each range bin, and detect the range bin number which exhibits the maximum power value; and a reflection coefficient computing means adapted to receive the range bin number transferred from the maximum power detection means, compute the reflection coefficients of the lattice filters except the data corresponding to the transferred range bin number, and transfer the reflection coefficients to the respective lattice filters.

Embodiment 2

An embodiment of the second aspect of the present invention will next be explained.

Figure 9:
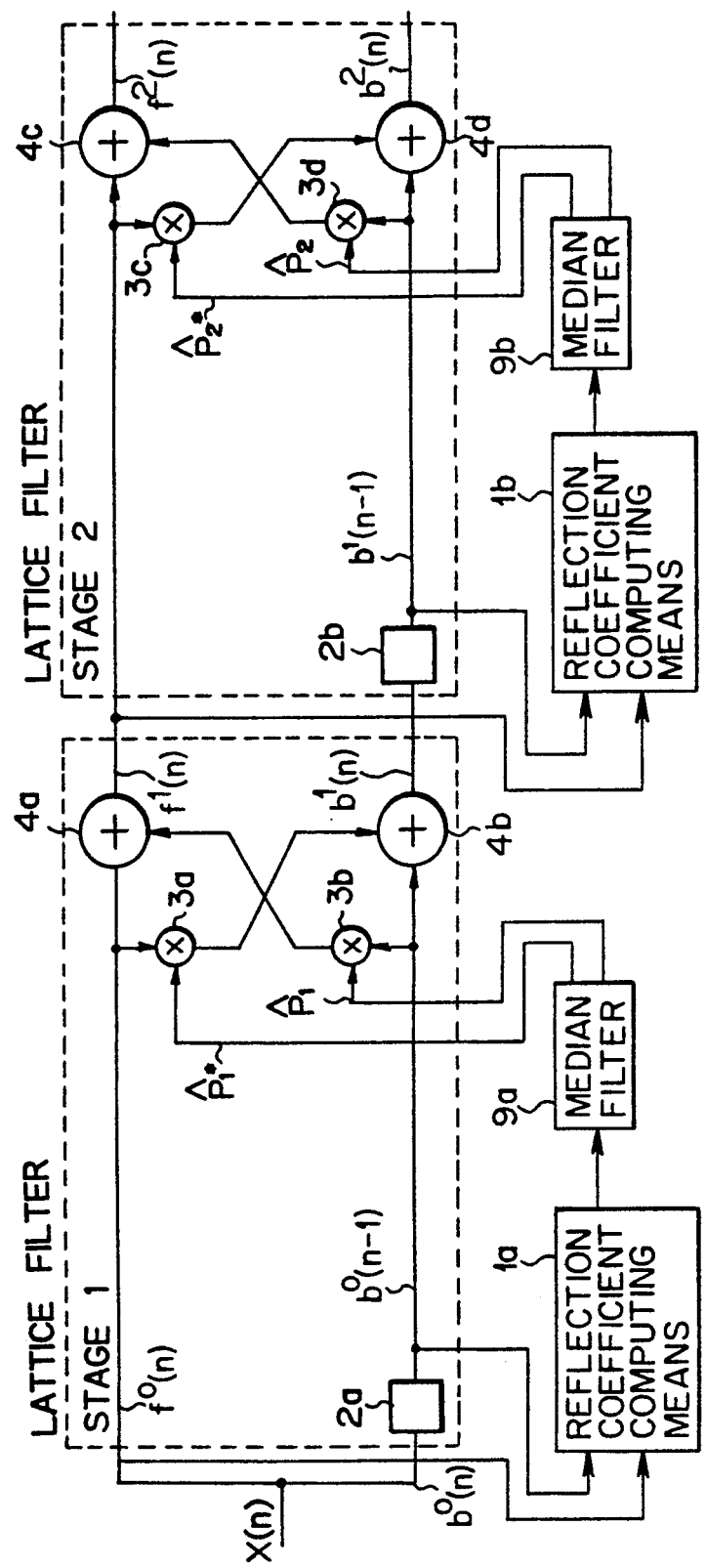
FIG. 9 is a block diagram illustrating embodiment 2 according to the present invention.

In FIG. 9, the respective reference numerals from 2 through 4 are identical to those included in the conventional clutter suppression device mentioned above. The difference between the present invention and the conventional clutter suppression device is in provision of reflection coefficient computing means $1a$ and $1b$ for computing the reflection coefficients for each range bin and median filters $9a$ and $9b$ for inputting the output from these reflection coefficient means $1a$ and $1b$.

Operations executed by the reflection coefficient computing means $1a$, $1b$ are equivalent and operations executed by the median filters $9a$, $9b$ are also equivalent. Accordingly, operations of the reflection coefficient computing means $1a$ and the median filter $9a$ only are explained for simplicity of explanation.

Assume here that the i-th range is to be processed. The reflection coefficient computing means $1a$ will take the data for the total (NL+NR) range out of the range from $i-\Delta R-NL$ to $i+\Delta R+NR$ from the reception signal and compute the lattice reflection coefficients in accordance with the following equation 13 for each range bin.

$$\rho_k^1 = -2 \frac{\sum_{n=2}^{3} f_k^0(n)^T \cdot b_k^0(n-1)^*}{\sum_{n=2}^{3} \{f_x^0(n)^T \cdot f_x^0(n)^* + b_k^0(n-1)^T \cdot b_k^0(n-1)^*\}} \quad (13)$$

where $k=(i-\Delta R-NL)-(i-\Delta R+1), \quad (i+\Delta R+1)-(i+\Delta R+NR)$ i: range bin to be processed NL: size of the data for computing the reflection coefficient at the left side of the processing range NR: size of the data for computing the reflection coefficient at the right side of the processing range ΔR: number of interval range bins between the processing range bin and the data for computing the reflection coefficient.

Specifically, the total number (NL+NR) of lattice reflection coefficients are generated and this number of (NL+NR) of lattice reflection coefficients are transferred to the median filters $9a$.

Figure 11:
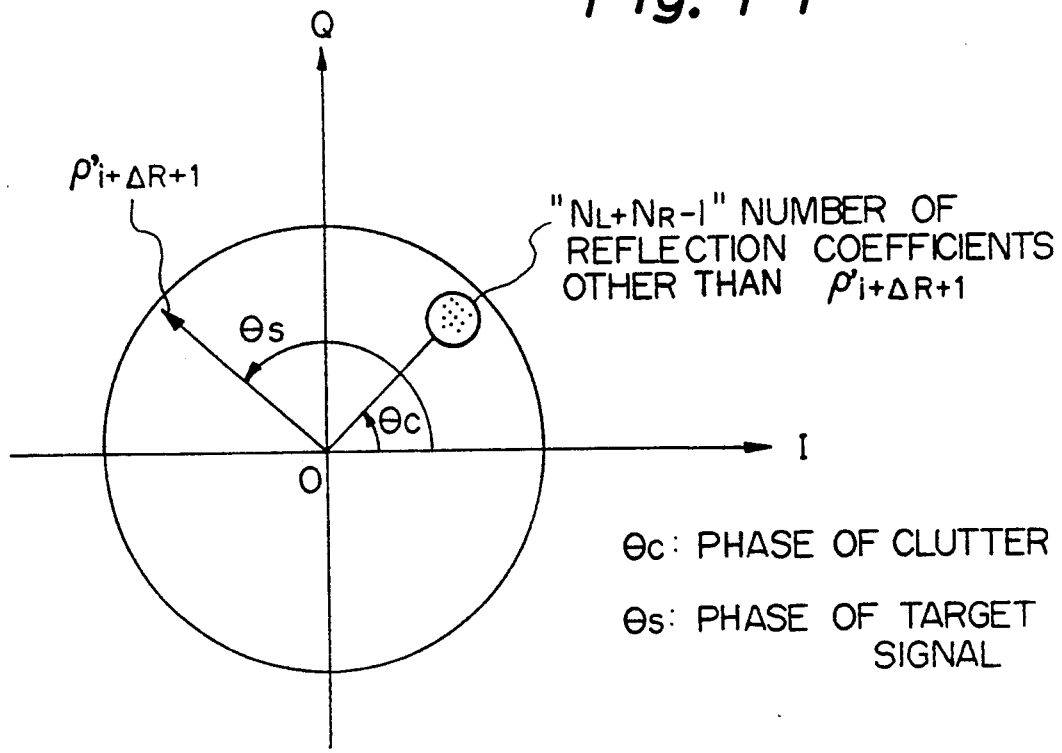
FIG. 11 is an explanatory schematic for operational principle of embodiment 2 according to the present invention.

Operation of the median filters will next be explained by referring to a flow chart in FIG. 10. Since the reflection coefficient $\rho_k^1$ which is calculated by the formula 13 is a complex value, the median filter $9a$ firstly separate the (NL+NR) number of the reflection coefficients into the I component and the Q component respectively at step S17. The reflection coefficients which have been separated into I component and Q component are respectively sorted, that is rearranged in the order from the smaller value to the large value at steps S18$a$ and S18$b$. Then, the values at the median among I components and Q components of the lattice reflection coefficients or the ((NL+NR)/2+1)-th value is respectively extracted at steps S19$a$ and S19$b$. Lastly, the I and Q components which have been extracted at the steps S19$a$ and S19$b$ are composed to obtain the reflection coefficients. For example, if there exists the target signal of large power in the range bin of $i+\Delta R+1$ in a similar manner as in the embodiment 1, the distribution of the reflection coefficients in a unit circle is defined as shown in FIG. 11. The reflection coefficient corresponding to the range bins of $i+\Delta R+1$ in which the target signal is present is distributed at different positions compared to (NL+NR−1) number of other reflection coefficients. In general, use of median filters provides such an effect as in executing average operation on a plurality of sample values by excluding the effects of the sample values having characteristics different from principle characteristic of the plurality of samples so that it is utilized for smoothing of the image processing and the like. It should be noted that use of median filters provides such an effect as in removing the lattice reflection coefficients corresponding to the range bin of $i+\Delta R+1$ in FIG. 11, that is eliminating the effect of the target signal, whereby clutter can be suppressed without being affected by the target signals.

In the embodiment as above described there has been shown a clutter suppression device for a pulse radar having a plurality of lattice filters connected in cascade and adapted to eliminate the reflection signals reflected from a substance other than a target, such as clutter or the like received by the pulse radar, the clutter suppression device being characterized by including a reflection coefficient computing means provided for each lattice filter and adapted to receive signals which are obtained by branching off input signals input into the respective lattice filters, and compute the lattice reflection coefficients for each range bin; and median filters adapted to receive the lattice reflection coefficients transferred from the reflection coefficients computing means, calculate the median value of the lattice reflection coefficients and transfer the median value to the lattice filters, respectively.

In the above-mentioned embodiment, two stages of lattice filters have been described. However, the number of the lattice filters is not limited to two but may be set at one or any number more than one. Different effects may be expected depending on the different numbers of the lattice filters.

Embodiment 3

Figure 12:
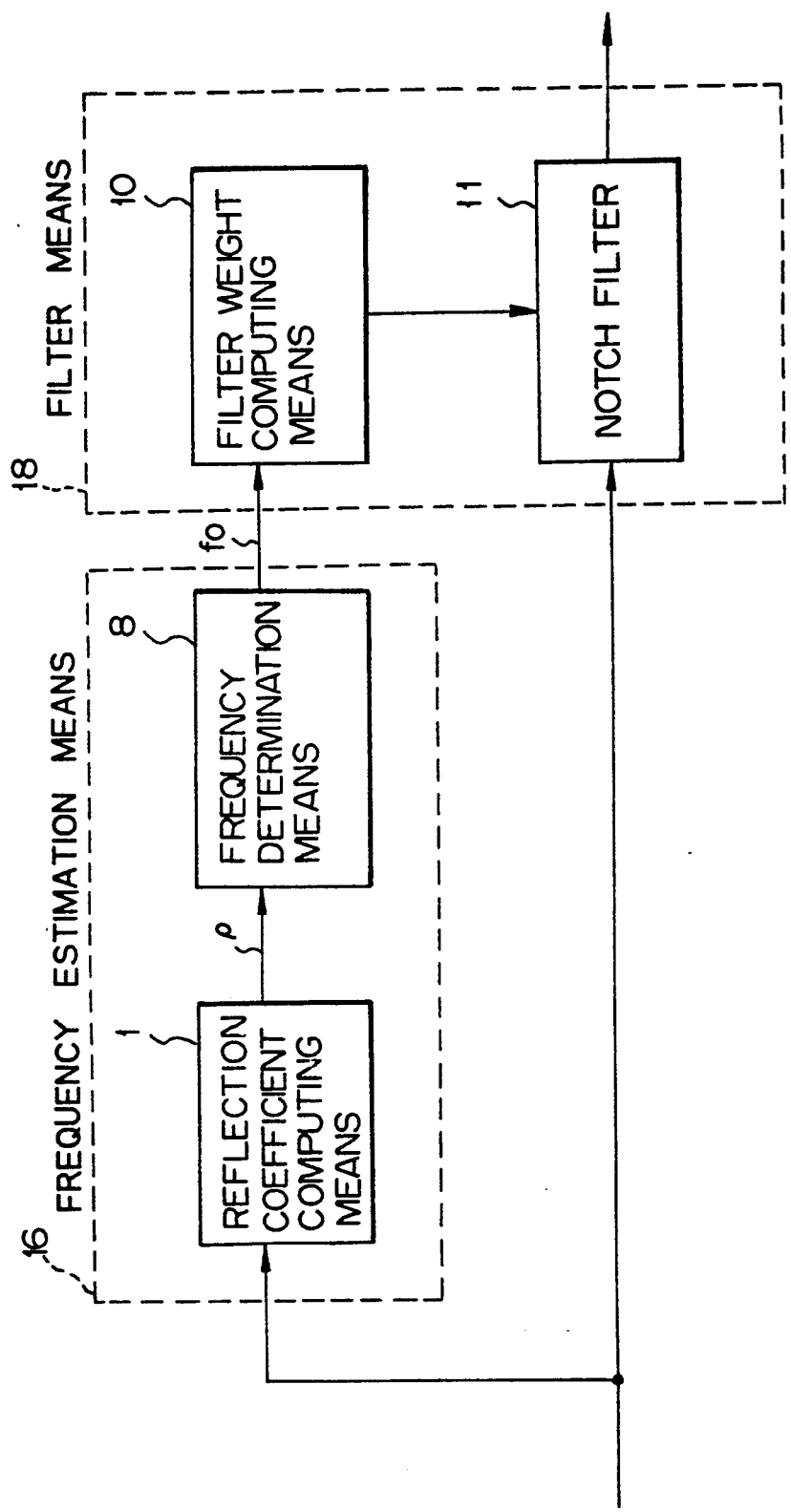
FIG. 12 is a diagram showing a constitution of embodiment 3 of the present invention.

An embodiment of the third aspect of the present invention will now be explained with reference to the accompanying drawings. In the drawing, those elements which are identical to or equivalent to those employed in the conventional clutter suppression device are denoted with identical reference numerals and explanation thereof will not be repeated. In FIG. 12, reference numeral 1 designates a reflection coefficient computing means, reference numeral 8 a frequency determination means adapted to estimate a control frequency of the clutter from the phase of the reflection coefficients transferred from the reflection coefficient computing means, reference numeral 10 a filter weight computing means for computing a notch filter weight on the basis of the coefficients of a predetermined notch filter and the control Doppler frequency of clutter transferred from the frequency determination means 8 to move the notch frequency of the notch filter relative to the clutter, reference numeral 11 the notch filter adapted to process the reception signals by use of the notch filter weight transferred from the filter weight computing means 10, reference numeral 16 a frequency estimation means and reference numeral 18 a filter means.

In order to analytically explain the principle of a method of estimating central frequencies of clutter, assumption is made that the reception signal $x_k(n)$ is provided by the following mathematical model.

$$x_k(n) = S \cdot \exp[j2\pi f_s] \cdot \Delta m0, m + C(k) \cdot [j2\pi f_c] + e(n) \quad (14)$$

where
- C(k): Complex Gaussian signal (clutter)
- S: Amplitude of a target signal
- $\Delta k0,k$: Kronecker delta signal
- e(n): Complex Gaussian signal (receiver's noise)
- $f_s$: Frequency of a target signal
- $f_c$: Central frequency of clutter
- k: Range bin number
- n: Pulse bit number The lattice reflection coefficient $\rho_k$ computed based on Burg's method is expressed by the equation (15).

$$\rho_k = -2 \cdot \frac{E[X_k(n)^T \cdot X_k(n-1)^*]}{E[|X_k(n)|^2 + |X_k(n-1)|^2]} \quad (15)$$

where E[ ] denotes the average operation.

If the equation (14) is substituted for the equation (15) and it is taken into consideration that the target signal, the clutter and the receiver's noise are independent with one another, then the equation (16) may be obtained.

$$\rho_k = -2 \cdot \frac{\sigma_s^2 \cdot \Delta k0,k \cdot \exp[j2\pi f_s] + \sigma_c^2 \cdot \exp[j2\pi f_c]}{2\{\sigma_s^2 \cdot \Delta k0,k + \sigma_c^2 + \sigma_N^2\}} \quad (16)$$

where
- $\sigma_s^2$: Average power of the target signal
- $\sigma_c^2$: Average power of the clutter
- $\sigma_N^2$: receiver's noise If assumption is further made that the power of the target signal and the receiver's noise is negligible as compared to that of the clutter, then the equation (16) may be approximated to the equation (17).

$$\rho_k = \exp[j2\pi f_c] \quad (17)$$

Accordingly by executing operation of the following equation (18) by using the reflection coefficient $\rho_k$, the central frequency of the clutter may be estimated.

$$f_c = \{\arctan(Q\rho_k/I\rho_k)\}/2\pi \quad (18)$$

where
- $Q\rho_k$: the imaginary part of $\rho_k$
- $I\rho_k$: the real part of $\rho_k$ In consideration of the fact that the number of the sampled data which may be actually used for calculation of the reflection coefficients is finite and the characteristics of saving the target signal has to be secured, the reflection coefficients may be calculated by using the equations 2a and 2b in a similar manner to the calculation of the equations 4a, 4b and 5a. Namely, if the i-th range bin is processed, the data for the (NL+NR) range which is the total of the range bin numbers $(i-\Delta R-NL)$ to $(i-\Delta R+1)$, and $(i+\Delta R+1)$ to $(i+\Delta R+NR)$ as shown in FIG. 3 are transferred to the reflection coefficient computing means 1. These data are used for executing operation shown in the equation 5a in the reflection coefficient computing means 1.

Figure 13:
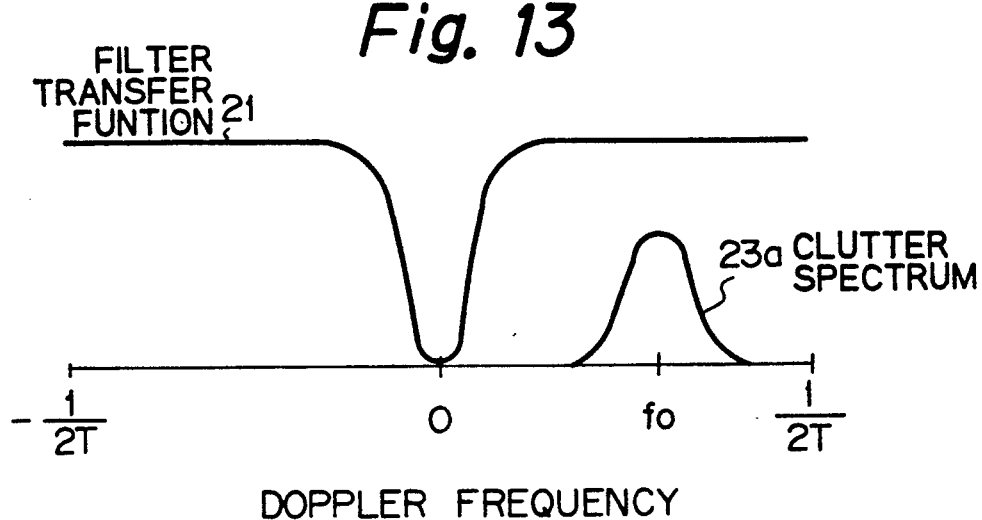
FIG. 13 shows a frequency spectrum for explaining an operation of the device according to a prior art.
Figure 14:
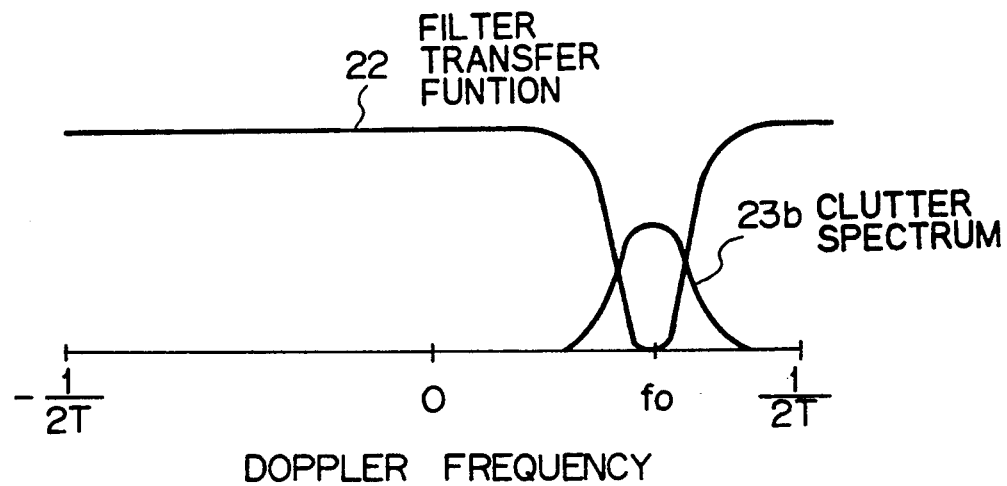
FIG. 14 shows the frequency spectrum for explaining the operation of embodiment 3 of the present invention.

The reflection coefficients which have been generated in the reflection coefficient computing means 1 are transferred to the frequency determination means 8. The frequency determination means 8 executes an operation as shown in the equation (18), estimates the Doppler central frequency of the clutter to be $f_0$ and transfers it to the filter weight computing means 10. The filter weight computing means 10 is adapted to compute the notch filter weight to be transferred to the notch filter 11, on the basis of the coefficients of the digital notch filter having a desired amplitude characteristic, which coefficients have been stored in such a memory as ROM. In general, the coefficients at the time of designing a notch filter of FIR type is a real number. If the coefficient values are applied as they are as the weight values of a notch filter, the notch of the notch filter is formed at the Doppler frequency zero as shown in FIG. 13. Therefore, such moving clutter having no zero Doppler frequency cannot be removed. In view of this, the filter weight computing means 10 is so constructed that the weight of the notch filter is adjusted in such a manner as the notch of a notch filter is formed with respect to the estimated Doppler central frequency as shown in FIG. 14 by executing operation of the following equation 19 by use of said coefficient values and the Doppler central frequency $f_0$ of the clutter transferred from the frequency determination means 8.

$$a_i = d_i \exp[j2\pi f_0 \cdot i] \quad (19)$$

$i = 0, 1, \ldots, L$ where L: number of stages of a notch filter.

Figure 15:
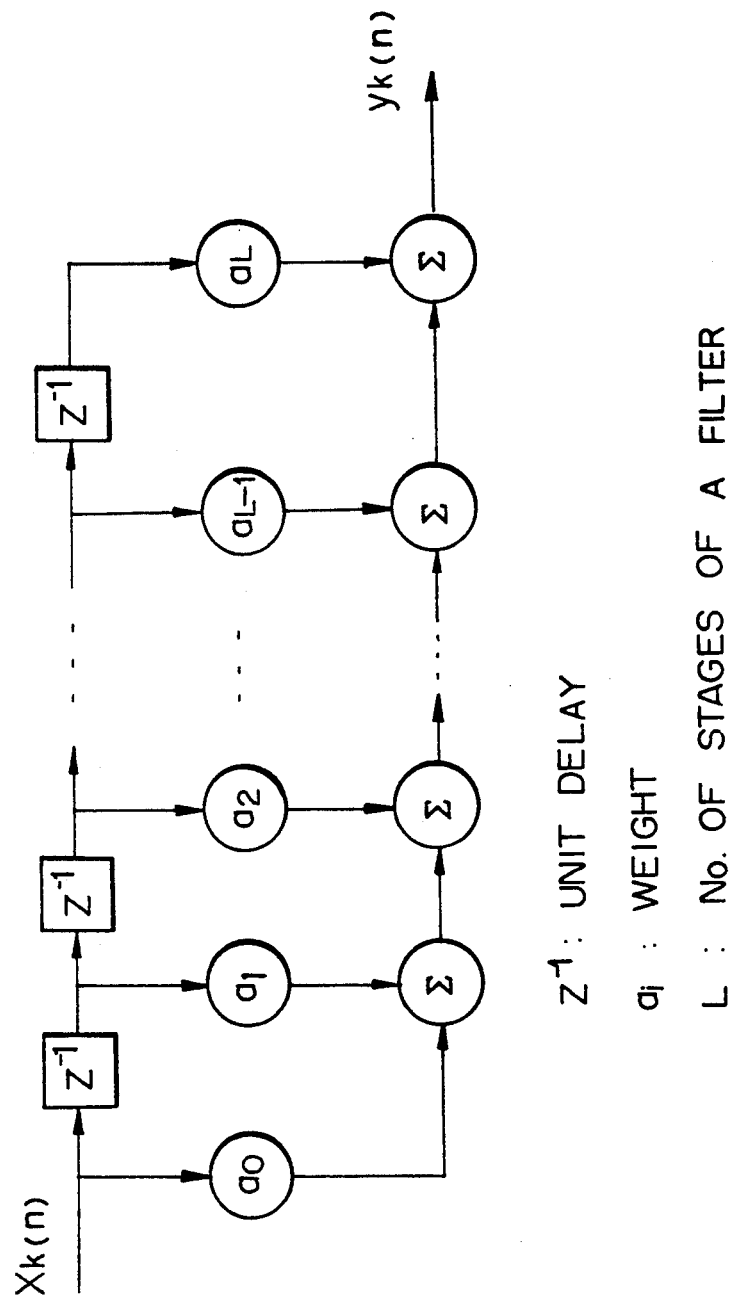
FIG. 15 is a block diagram illustrating a constitution of a clutter suppression filter according to an embodiment of the present invention.

The weight $a_i$ thus calculated is transferred to the notch filter 11. In the notch filter 11, the weight obtained in the equation 19 is applied to the notch filter (or FIR type filter in this example) shown in FIG. 15 so as to filter the reception signals. In other words, operation of the following equation 20 is executed.

$$y(m) = \sum_{i=0}^{L} a_i \cdot x(m-i) \quad (20)$$

$m = 1, 2, \ldots, N$ where
x(m): Input signals
y(m): Output signals
N: Hit size of input signals
L: Number of stages of a filter The clutter component included in the estimated Doppler central frequency range of clutter is removed by the equation 20, such that the target signals may be detected.

Figure 16:
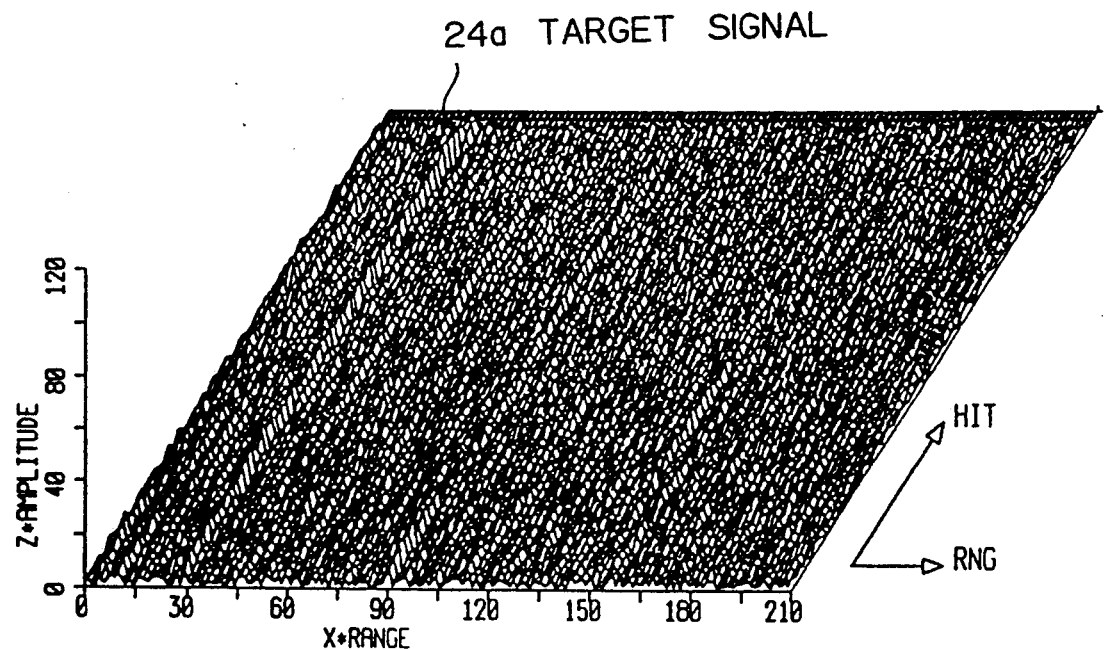
FIG. 16 illustrates the performance of the clutter suppression device according to a prior art.
Figure 17:
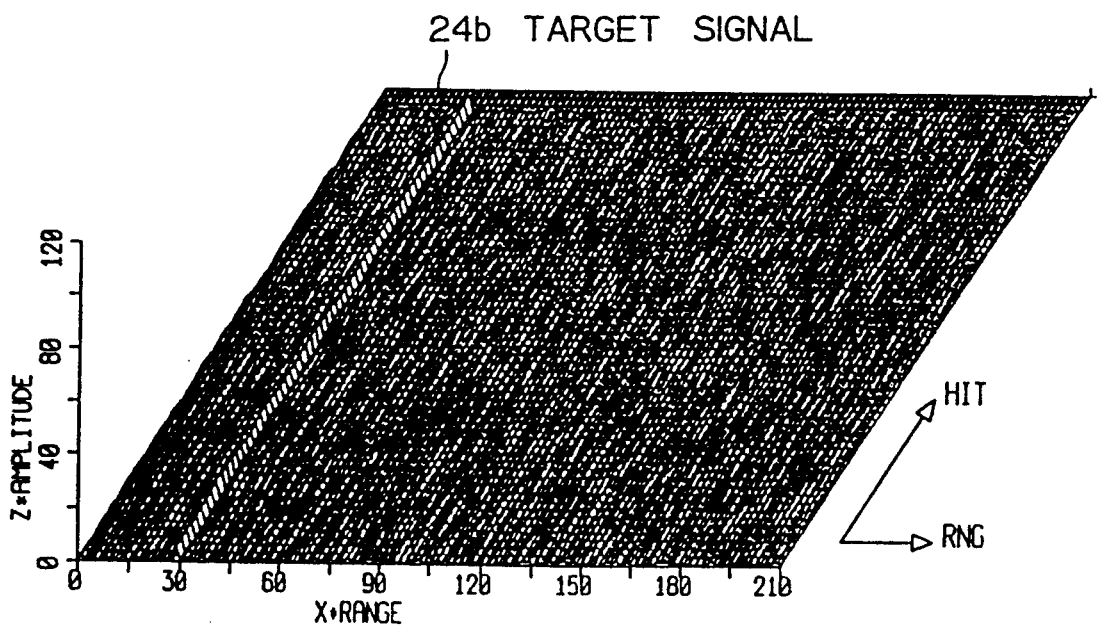
FIG. 17 illustrates the performance of the clutter suppression device according to the present invention.
Figure 18:
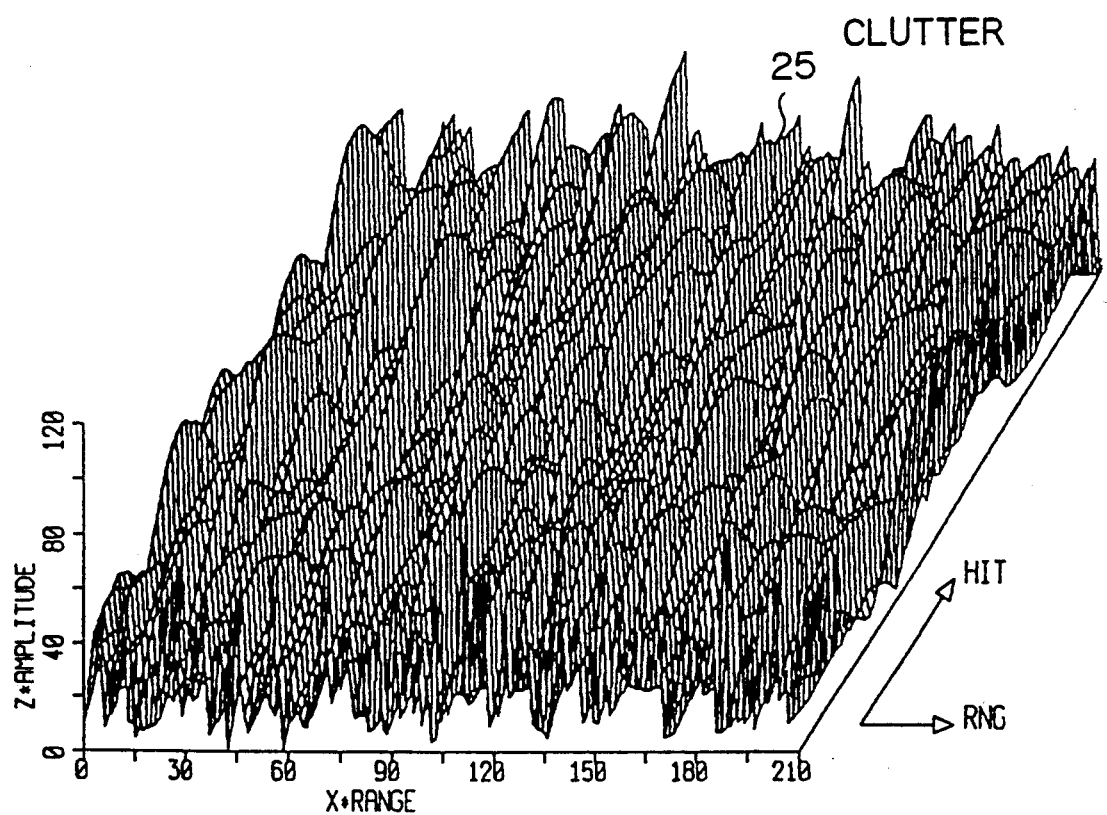
FIG. 18 illustrates the input signals in the form of the computer-aided simulation.

The result of computer-aided simulation (amplitude waveform of output signals) of the prior art and the embodiment of the third aspect of the present invention are respectively illustrated in FIG. 16 and FIG. 17. FIG. 18 illustrates the amplitude waveform of the input signals where the ordinate of the axis designates amplitude, the abscissa designates the range and the depth designates the pulse hit. The values of the principle parameters which have been used in the calculation for the illustration in FIG. 16 and FIG. 17 are as follows.

Principle Parameters for Calculation Examples

Target signal:
  SNR = 10 dB, Frequency = 0.3
  Range # = 30
Clutter:
  CNR = 30, Central frequency = −0.2
  Band range = 0.047, Range # = 1−230
Learning block size (Range-Hit): 3-5
Interval between processing range and learning block
Coefficient of Filter:
  $h_0 = 0.119522860$
  $h_1 = -0.478091440$
  $h_2 = 0.717137170$
  $h_3 = -0.478091440$
  $h_4 = 0.119522860$
No. of stages of filter: 4

It is to be noted that the frequency in the above-mentioned parameters has been normalized by a pulse repetition frequency. It is also to be understood that the learning block size designates the range bin and the number of pulse hit of the reception signals input to the reflection coefficient computing means 1, shown in FIG. 3 when the reception signal for any one of the range bins is processed.

It can be seen from FIG. 16 that the amplitudes of the output signal produced by a prior art include unremoved clutter here and there and that if the target signal is automatically detected by using this signal, unremoved clutter may cause the target signal to be erroneously detected, resulting in generation of an error alarm. On the other hand, FIG. 17 which exhibits the result of processing done by the embodiment of third aspect of the present invention shows no unremoved clutter thus allowing a reliable detection of the target.

In the embodiment as above, there has been described such a clutter suppression device for a pulse radar for removing the reflection signals except those of the target characterized in comprising a notch filter adapted to receive the reception signals from the pulse radar and remove the clutter therefrom, a frequency estimation means adapted to receive the reception signals from the pulse radar and estimate the Doppler central frequency of the clutter and a filter weight computing means adapted to receive the Doppler central frequency of the clutter transferred from the frequency estimation means, calculate the weight of a notch filter so that the notch of the notch filter is formed with respect to the Doppler central frequency of the clutter without varying the amplitude characteristic of a pre-designed notch filter and transfer the calculated weight to the notch filter; and in that the frequency estimation means includes a reflection coefficient computing means adapted to compute the lattice reflection coefficients from the reception signals, and a frequency determination means adapted to receive the lattice reflection coefficients transferred from the reflection coefficient means and estimate the Doppler central frequency of the clutter by using the phase of the lattice reflection coefficients.

In the above embodiment, there has also been explained such a clutter suppression device as including the following frequency estimation means and the filter means.

(a) A frequency estimation means including;
(a1) a reflection coefficient computing means adapted to receive the reception signal data and compute the lattice reflection coefficients, and
(a2) a frequency determination means adapted to receive the lattice reflection coefficients transferred from the lattice reflection coefficient computing means and estimate the Doppler central frequency of the clutter on the basis of the phase term of the transferred lattice reflection coefficients, and
(b) A filter means including,
(b1) a filter weight computing means adapted to compute the notch filter weight by using the notch filter coefficients designed in advance to attain a desired clutter suppression performance so that the notch of a notch filter is formed at the area including clutter, and
(b2) a notch filter adapted to process the reception signals by using the filter weight values which have been computed by the filter weight computing means.

As described above, according to this embodiment, the lattice reflection coefficients by the reflection coefficient computing means by receiving the reception signals, the Doppler central frequencies of the moving clutters having a single crest included in the reception signals are estimated from the phases of the lattice reflection coefficients and the clutter may be suppressed by moving the notch of a notch filter to the range including the clutter in accordance with the pre-designed notch filter coefficients and the estimated frequency without changing amplitude characteristics of the notch filter. Therefore, a removed clutter caused by variation of the notch depth of the notch filter and notch frequency can be mitigated.

Embodiment 4

Figure 19:
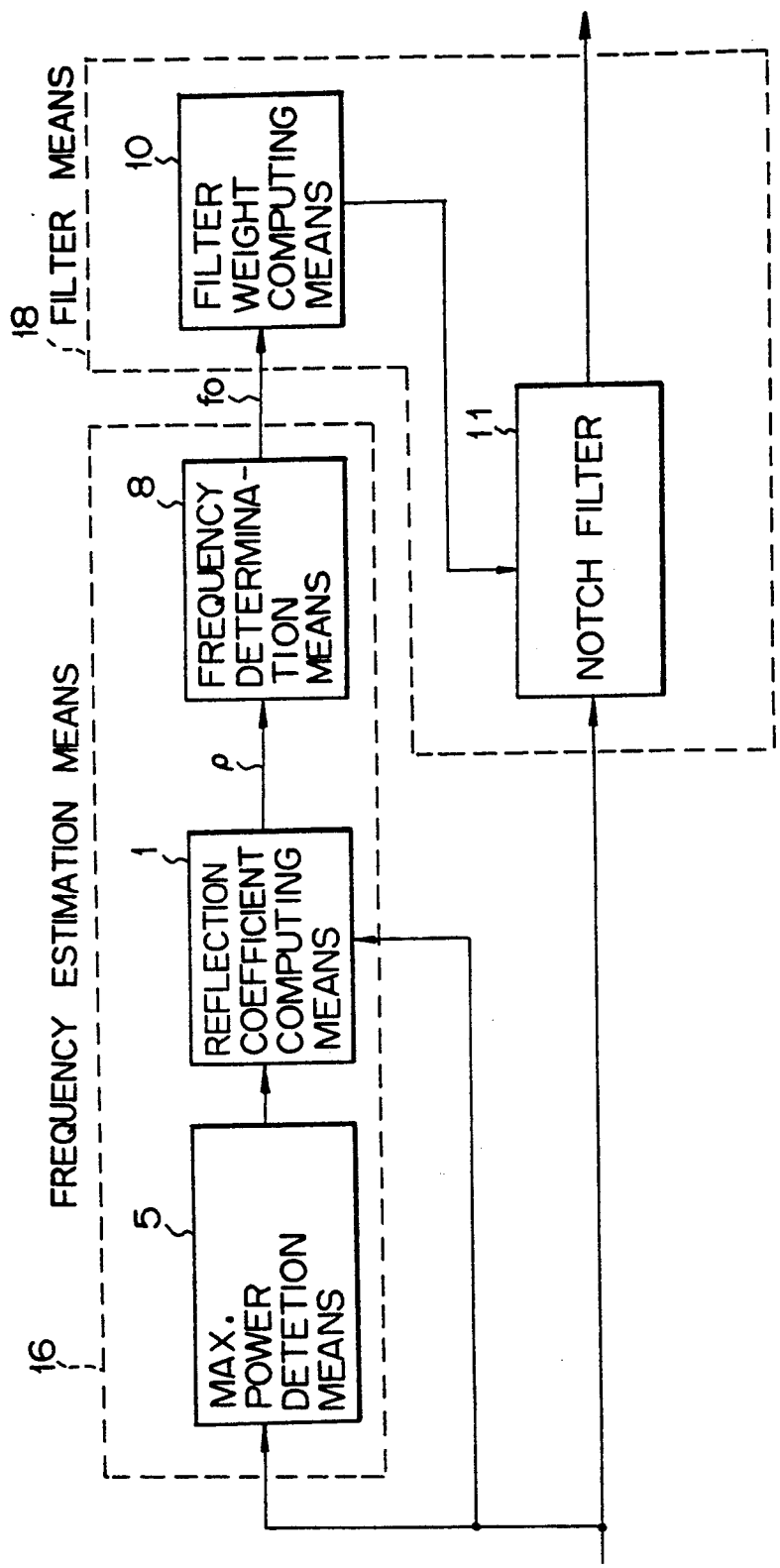
FIG. 19 illustrates a constitution of embodiment 4 according to the present invention.

FIG. 19 illustrates a constitution of the fourth embodiment of the fourth aspect of the present invention. In FIG. 19, the identical elements equivalent to those in the prior art and the above-described embodiments 1 and 3 are denoted by the identical reference numerals and the explanation thereof is not repeated here. In the above-described embodiment 3, in the case that the power of the target signal is not negligible as compared to that of the clutter, the notch of a filter is displaced from the frequency range of clutters due to the effect of the target signal as shown in FIG. 20, resulting in the possibility of degradation of the clutter suppression performance in the vicinity of the range in which the target signal is present. In this embodiment, therefore, the clutter suppression device comprises the following elements in order to mitigate degradation of the clutter suppression performance mentioned above.

(a) A maximum power detection means adapted to receive the reception signal data, compute the power for each range bin and transfer the range bin number corresponding to the range bin which exhibits the maximum power value, (b) A lattice reflection coefficient computing means adapted to receive the range bin number transferred from the maximum power detection means and compute the lattice reflection coefficients except the data corresponding to the transferred range bin number, (c) An estimated frequency determination means adapted to receive the lattice reflection coefficients transferred from the lattice reflection coefficient computing means and estimate the Doppler central frequency of the clutter on the basis of the phase term of the transferred lattice reflection coefficients, (d) A filter weight computing means adapted to compute the notch filter weight by using the notch filter coefficients designed in advance to attain a desired clutter suppression performance so that the notch of a notch filter is formed in the range in which clutter is present, and (e) A notch filter adapted to process the reception signals by using the filter weight values computed by the filter weight computing means.

The elements enumerated from (a) through (c) will next be explained by referring to the drawing.

In FIG. 19, reference numeral 5 designates the maximum power detection means adapted to receive the reception signals, detect and output the range bin number which exhibits the maximum power, and reference numeral 1 the reflection coefficient computing means adapted to compute the lattice reflection coefficients except the data corresponding to the range bin number transferred from the maximum power detection means 5.

Figure 21:
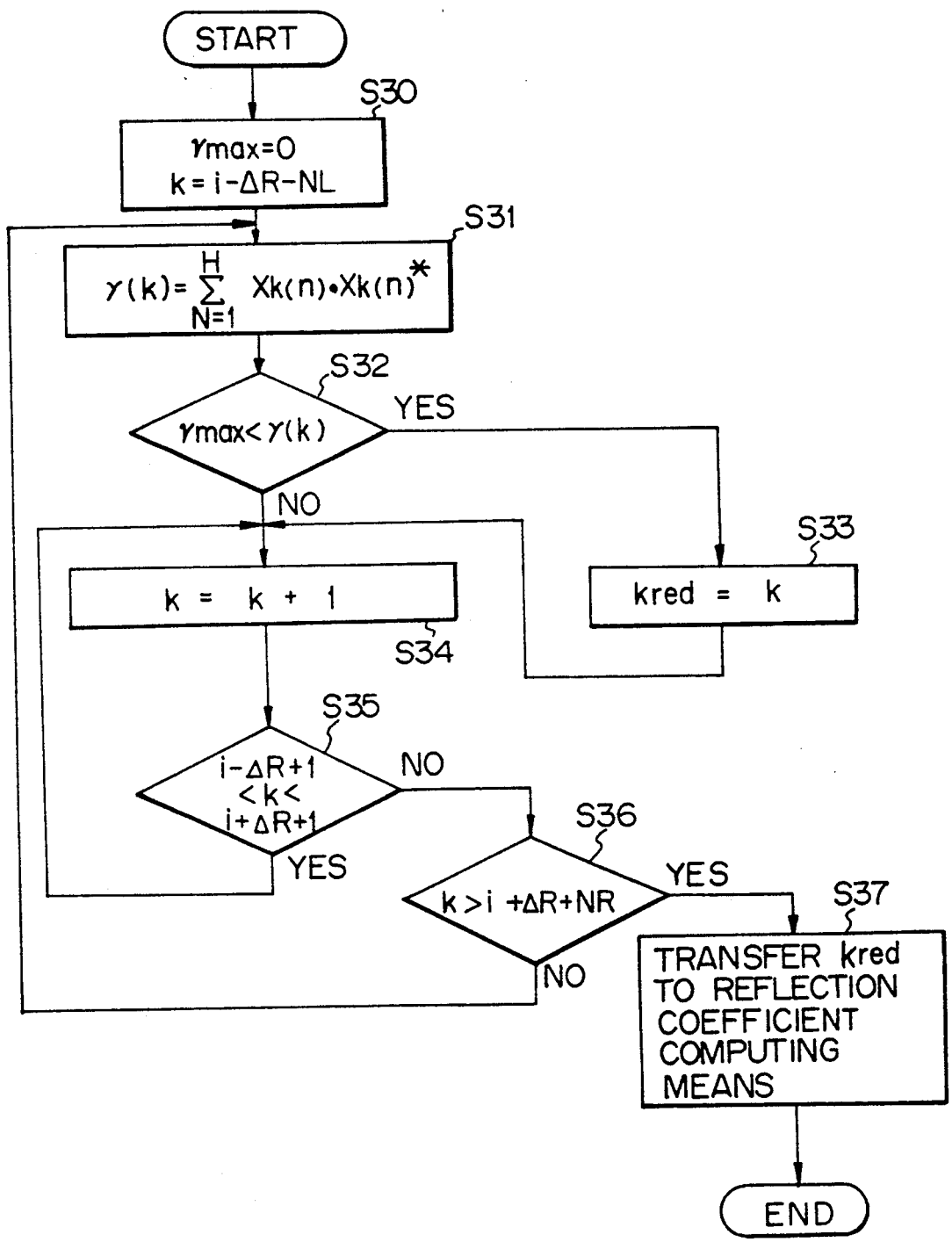
FIG. 21 is a flow chart for explaining an operation of a maximum power detection means in embodiment 4 of the present invention.

Assume that the i-th range is processed. The maximum power detection means 5 takes the data for total (NL+NR) range out of the range from $i-\Delta R-NL$ to $i+\Delta R+NR$ from the reception signals and detects the range bin number exhibiting the maximum power. The processing manner of the maximum power detection means 5 is next explained by referring to a flow sheet in FIG. 21. In the flow chart, the symbol H designates a size of the learning block in the direction of hit, NR and NL designate respectively the size of the learning block in the direction of range at the left and right sides of the processing range and $\Delta R$ designates the interval between the processing range and the learning block. In step S30, the range bin number exhibiting the maximum power value is cleared and the minimum range bin number of the data which have been read is set to variable k. The power value which is computed by the following equation from the reception signal $X_k(n)$ in accordance with the set range bin number is computed at step S31.

$$\gamma(k) = \sum_{n=1}^{H} X_k(n) \cdot X_k(n)^* \qquad (21)$$

where

H: Size of learning block in the direction of hit.

In step S32, decision is made as to whether the $\gamma(k)$ calculated at step S31 is the maximum or not in the values which have been computed so far. If so, the corresponding range bin number K is substituted for $k_{red}$ in step S33. Then at step S34, the variable k is updated so as to calculate the power value of the next range bin data. At this time, the data for computing the lattice reflection coefficients are provided at the opposite sides of the processing range i with offset by $\Delta R$ as shown in FIG. 3. Thus, if the variable k is updated, the offset $\Delta R$ and the processing range i are included in the data. Accordingly at step S35, decision is made so that these range bin data should not be included. Processing of the data is completed by step S36 when the variable k just exceeds $i+\Delta R+NR$, and, at step S37, the range bin number $k_{red}$ which has exhibited the maximum power is transferred to the lattice reflection coefficient computing means 1. If there is a large target signal present in the data for computing the lattice reflection coefficients, that $k_{red}$ will then exhibit the range bin number in which the target signal is present.

In the reflection coefficient computing means 1, the lattice reflection coefficients are computed in accordance with the equations 22a through 22c. The difference between the third embodiment of the present invention and the present embodiment is in that computation is executed without including the data corresponding to the range bin number $k_{red}$ transferred from the maximum power detection means 5. For example, if $k_{red}=i+\Delta R+1$, the lattice reflection coefficient is computed by the following equation.

$$bX_i^0(n) = \qquad (22a)$$

$$[X_{i-R-NL}(n), \ldots, X_{i-R+1}(n), X_{i+R+2}(n), \ldots, X_{i+R+NR}^0(n)]$$

$$p_k = \qquad (22b)$$

$$-2 \frac{\sum_{n=2}^{H-1} bX_i(n)^T \cdot bX_i(n-1)^*}{\sum_{n=2}^{H-1} \{bX_i(n)^T \cdot bX_i(n)^* + bX_i(n-1)^T \cdot bX_i(n-1)^*\}}$$

where $i=1, 2, \ldots, k$

The Doppler central frequency $f_0$ of the clutter estimated by the equations 22b and 18 include no data relating to the target signal but only information relating to clutter. Accordingly, the notch filter is capable of forming a notch for a clutter as shown in FIG. 22, whereby the clutter may be suppressed without being affected by the target signal.

In the embodiment as above mentioned, there has been explained a clutter suppression device characterized in that the frequency estimation means comprises a maximum power detection means adapted to compute and compare the power value of said reception signals for each bin and detect the range bin number exhibiting the maximum power value, a reflection coefficient computing means adapted to receive the reception signals, and compute the lattice reflection coefficients except the data corresponding to the range bin number transferred from the maximum power detection means, and an estimated frequency determination means adapted to receive the lattice reflection coefficients transferred from the reflection coefficient computing means and estimate the Doppler central frequency of the clutter by using the phase of the transferred lattice reflection coefficients.

According to the embodiment 4, in a pre-processing operation for computing the lattice reflection coefficients, the power values for each range bin of the data input at the maximum power detection means are computed and compared with one another to detect a range bin number which exhibits the maximum power and the lattice reflection coefficients are calculated, except for the data corresponding to the range bin number, to estimate the central frequency of the clutter on the basis of the phases of the calculated lattice reflection coefficients, whereby degradation of the clutter suppression performance in the vicinity of the range bin including the target signal due to the affect by the target signal of a large power can be mitigated.

Embodiment 5

Figure 23:
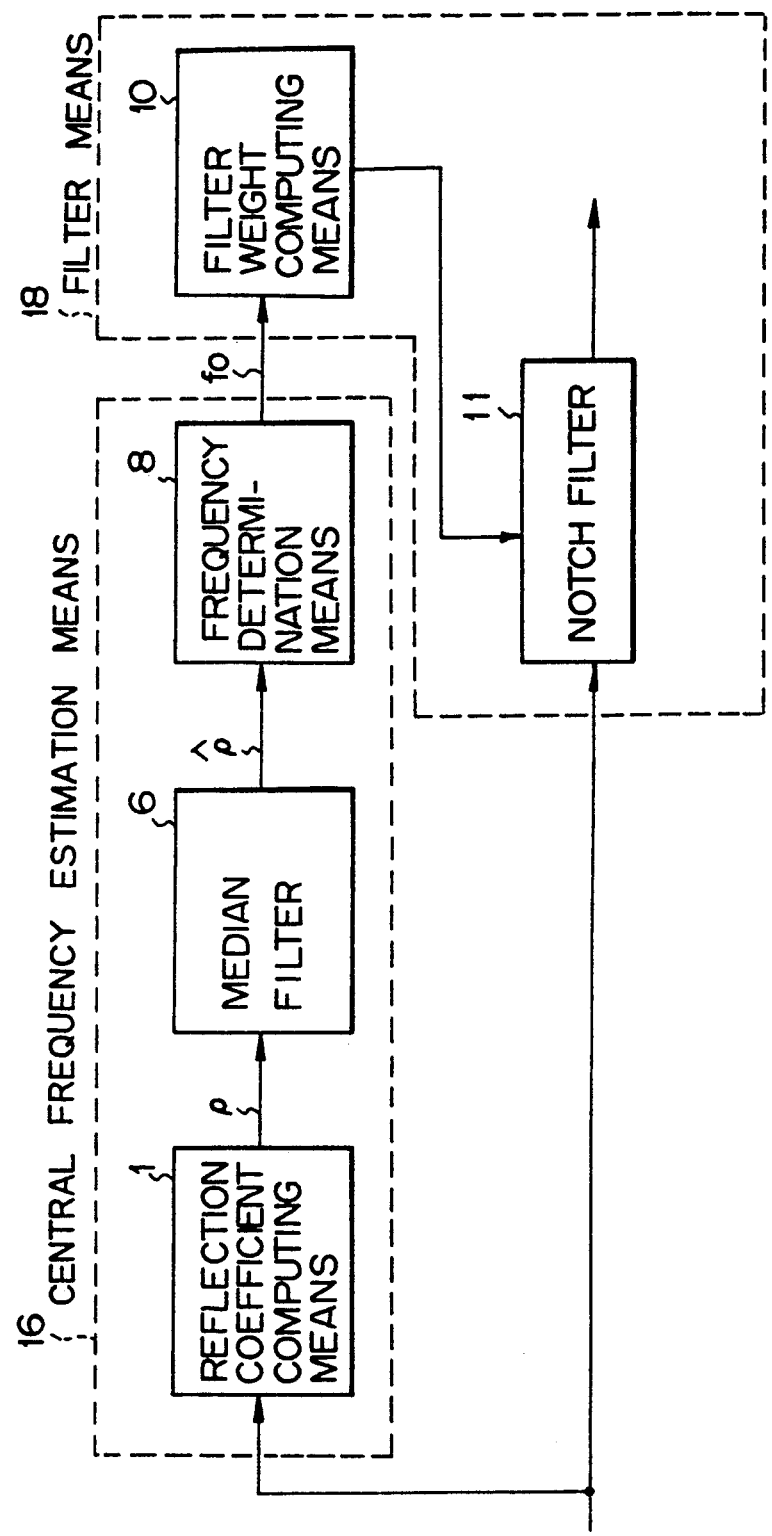
FIG. 23 illustrates a constitution of embodiment 5 according to the present invention.

FIG. 23 illustrates a constitution of an embodiment of the fifth aspect of the present invention. In FIG. 23, the identical elements to those employed in the prior art, and the above-described embodiments 3 and 4 are denoted with identical reference numerals and explanation thereof is not repeated. In the embodiment 3, if the power of the target signal is not negligible as compared to the power of the clutter, the notch of a notch filter is displaced from the frequency range of the clutter due to the effect by the target signal and the clutter suppression performance in the vicinity of the range in which the target signal is present may be degraded. This embodiment comprises the following elements in order to mitigate degradation of the clutter suppression performance mentioned above.

(a) A lattice reflection coefficient computing means adapted to receive the reception signals and compute the lattice reflection coefficient for each range bin, (b) A median filter adapted to receive a plurality of lattice reflection coefficients transferred from the lattice reflection coefficient computing means and transfer the median value thereof, (c) An estimated frequency determination means adapted to receive the median value of the lattice reflection coefficients transferred from the median filter and estimate the central frequency from the phase term thereof, (d) A filter weight computing means adapted to compute the notch filter weight by using the notch filter coefficients designed in advance to obtain a desired clutter suppression performance so that the notch of a notch filter may be formed in the range in which clutter is present, and (e) A notch filter adapted to process the reception signals by using the filter weight values computed by the filter weight computing means.

The elements (a) through (e) will now be explained by referring to the drawing.

In FIG. 23, reference numeral 1 designates a reflection coefficient computing means for receiving reception signals to compute the lattice reflection coefficient for each range bin, and reference numeral 6 designates a median filter adapted to compute and output the median value of the reflection coefficients transferred from the reflection coefficient computing means 1.

Assume here that the i-th range is to be processed. The reflection coefficient computing means 1 takes the data for a total (NL+NR) range out of the range from i−ΔR−NL to i+ΔR+NR, from the reception signals and computes the lattice reflection coefficients in accordance with the following equation 23 for each range bin.

$$\rho_k = -2 \frac{\sum_{n=2}^{H-1} X_k(n)^T \cdot X_k(n-1)^*}{\sum_{n=2}^{H-1} \{X_k(n)^T \cdot X_k(n)^* + X_k(n-1)^T \cdot X_k(n-1)^*\}} \quad (23)$$

where k=i−ΔR−NL to i−ΔR+1, i+ΔR+1 to i+ΔR+NR

More specifically, the lattice reflection coefficients, the number of which is a total (NL+NR), are generated and is transferred to the median filter 6.

Figure 10:
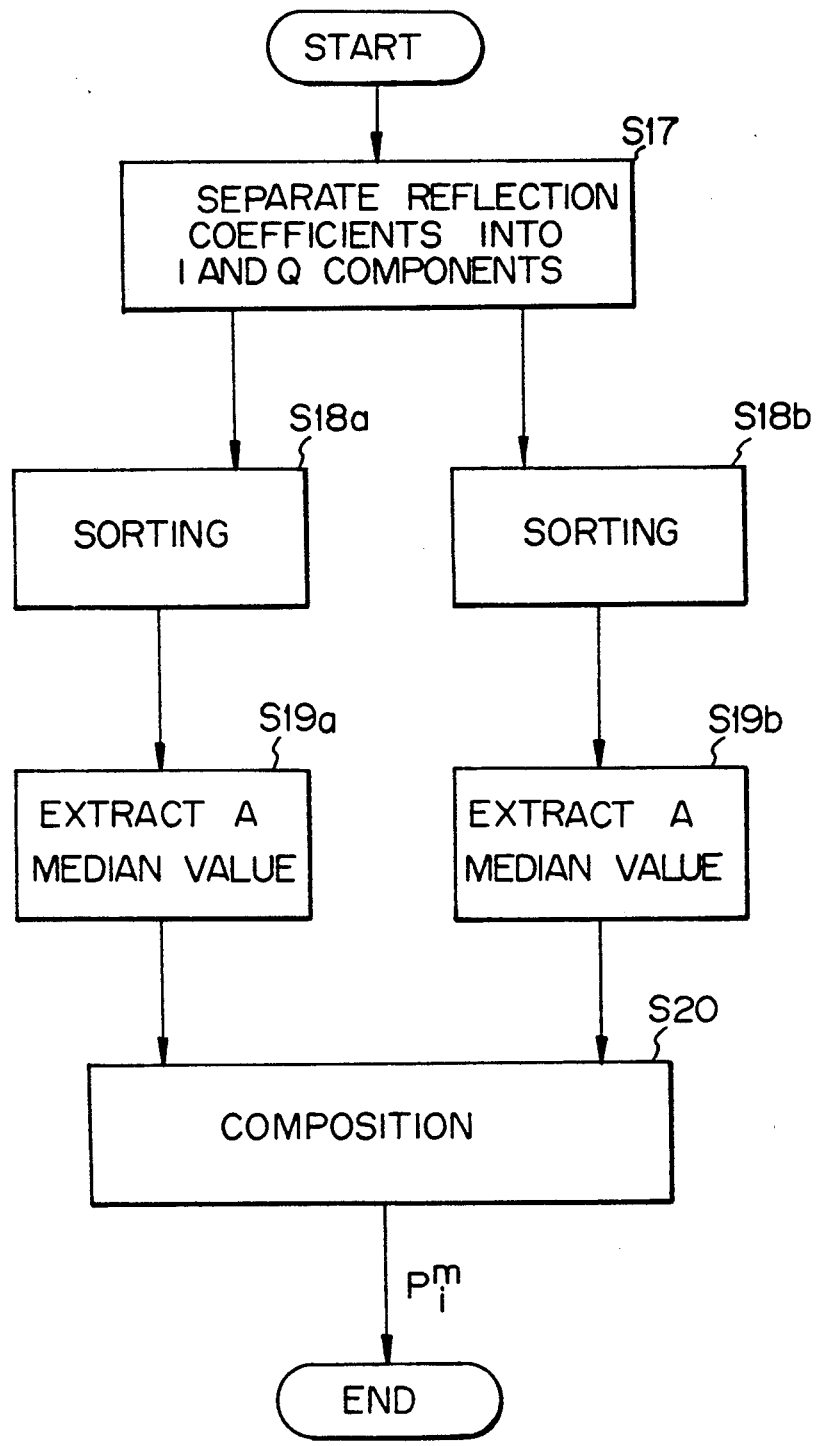
FIG. 10 is a flow chart illustrating the operation of a median filter.

Since operation of the median filter 6 has been explained already with reference to FIG. 10 and FIG. 11, further explanation is not repeated here.

Since use of the median filter enables elimination of the effect of the lattice reflection coefficient corresponding to the range bin including the target signal, or elimination of the effect of the target signal, the Doppler central frequency of clutter may be estimated without being affected by the target signal and the clutter may be suppressed by the notch filter.

In this embodiment, there has been explained a clutter suppression device characterized in that the frequency estimation means comprises a reflection coefficient computing means for receiving the reception signals to compute the lattice reflection coefficient for each range bin, a median filter for receiving a plurality of lattice reflection coefficients transferred from the lattice reflection coefficient computing means to compute the median value of the plurality of lattice reflection coefficients, and an estimated frequency determination means for receiving the median value of the lattice reflection coefficients transferred from the median filter to estimate the Doppler central frequency of the clutter by using the phase of the median value of the lattice reflection coefficient.

According to the embodiment 5, the lattice reflection coefficients for each range bin are computed by inputting the reception signals, and the median value of a plurality of lattice reflection coefficients are computed by the median filter to estimate the Doppler central frequency of the clutter in accordance with the phases of the lattice reflection coefficients, whereby degradation of clutter suppression performance in the vicinity of the range bin including the clutter due to the affect by the target signal of a large power can be mitigated.

Embodiment 6

Figure 24:
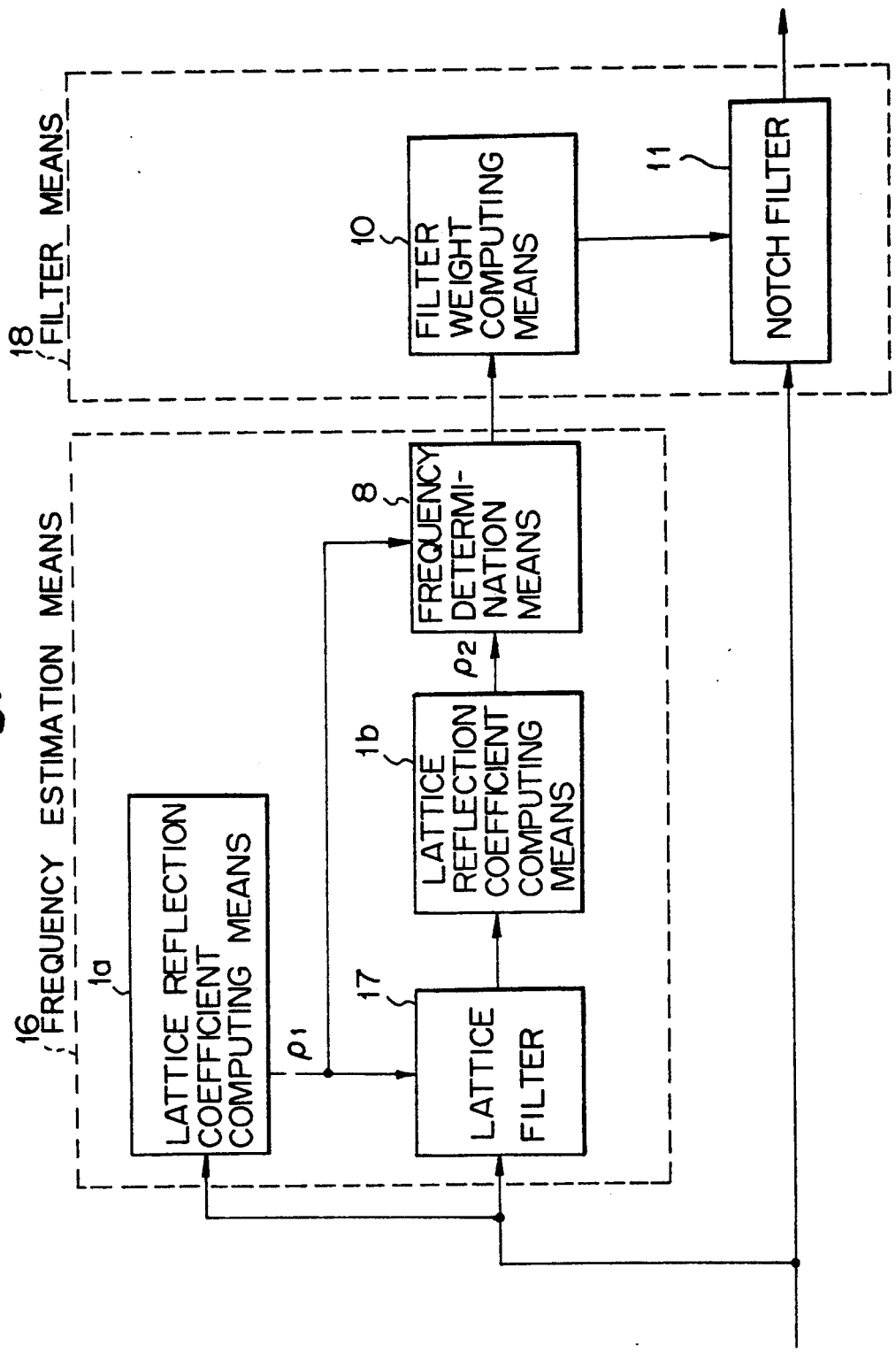
FIG. 24 illustrates a constitution of embodiment 6 according to the present invention.
Figure 26A:
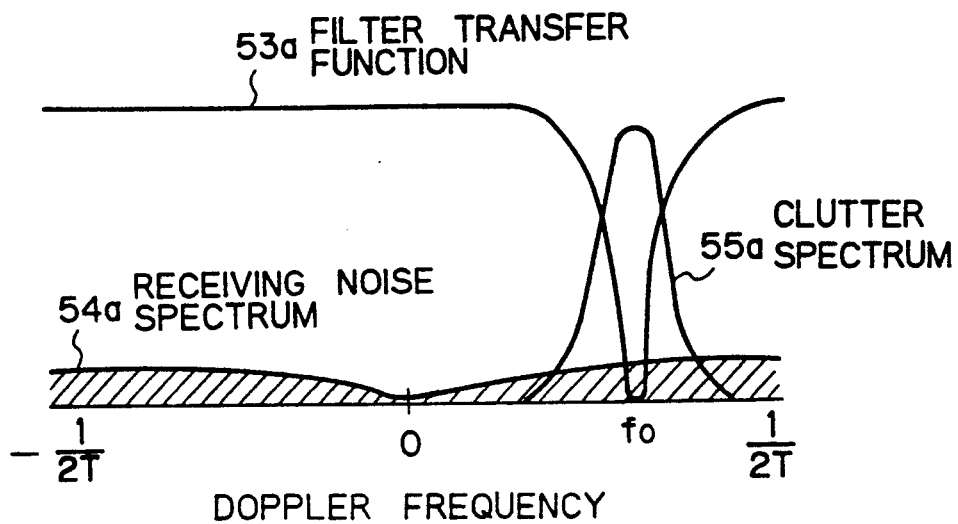
FIGS. 26(a) and 26(b) illustrate another frequency spectrums for explaining the operation of embodiment 6 of the third and fourth aspects of the present invention.
Figure 26B:
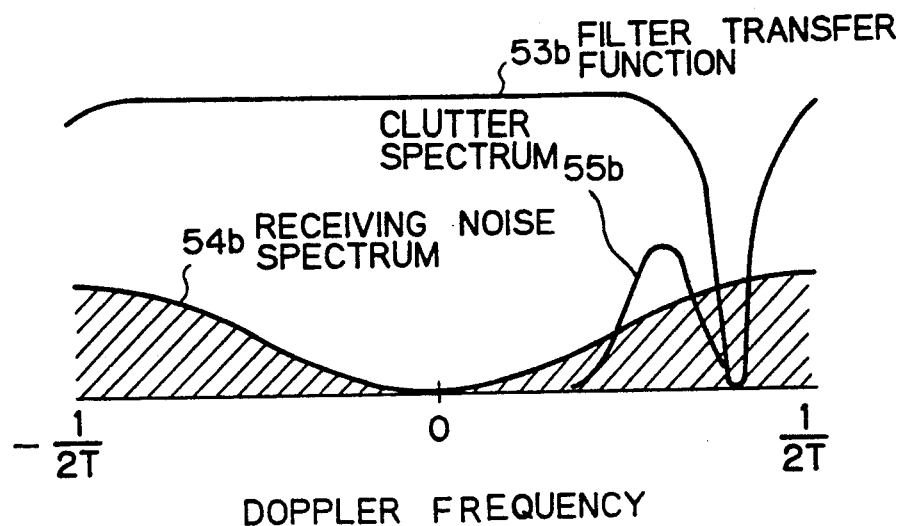

FIG. 24 illustrates a constitution of an embodiment of the sixth aspect of the present invention. In FIG. 24, identical elements to those employed in the prior art and the above-mentioned embodiments are denoted by identical reference numerals and explanation thereof is not repeated here. In the embodiment of the third aspect of the present invention as described above, clutter included in the reception signals by the radar were assumed to be movable clutter with a single crest. Actually, however, not only the movable clutter but also ground clutter or sea clutter may be included in the reception signals. In this connection, there is such a method of clutter suppression in which the ground and sea clutter of which Doppler frequency is near zero are suppressed by a manual MTI as shown in FIGS. 25(a) and 20(b) and after that movable clutter which might be left in the output signals from the manual MTI is removed by the clutter suppression device according to the embodiment 3. However, when manual MTI processing is executed, not only clutter but also receiver noise will be subject to modulation. In general, receiver noise has a spectrum which is flat in its band. If the spectrum is observed after it has been processed by the manual MTI processing, it becomes chromatic as seen from FIG. 25(b). When the clutter suppression device according to the embodiment 3 is operated for this sort of signals, there is no problem, if the clutter power is far greater than the receiver's noise power. However, if the clutter power is at a level of the receiver noise, the clutter power must be taken into account as seen from FIG. 26(b), the means for estimating the Doppler central frequency of clutter will be affected by the receiver noise, resulting in an error in estimation. As a result, the estimated frequency will deviate from the central frequency of clutter, so that a notch cannot be formed for the clutter, resulting in an inability to suppress the clutter.

In the sixth embodiment, the clutter suppression device comprises the following elements so as to mitigate the estimation error as above mentioned.

(a) A lattice reflection coefficient computing means for receiving reception signals to compute lattice reflection coefficients, (b) A lattice filter adapted to process the reception signals by using the lattice reflection coefficients transferred from the lattice reflection coefficient computing means, (c) A second lattice reflection coefficient computing means for receiving the signals transferred from the lattice filter to compute a second lattice reflection coefficients, (d) An estimated frequency determination means for receiving the second lattice reflection coefficients transferred from the second lattice reflection coefficient computing means, to estimate the central frequency of the clutter from the phase of the second transferred lattice reflection coefficients, (e) A filter weight computing means adapted to compute the notch filter weight by using the notch filter coefficient designed in advance to attain a desired clutter suppression performance so that the notch of a notch filter may be formed in the range in which clutter is present, and (f) A notch filter adapted to process the reception signals by using the filter weight values computed by the filter weight computing means.

The elements (a) through (f) will now be explained by referring to the drawing.

In FIG. 24, reference numeral $1a$ designates the first reflection coefficient computing means for receiving signals which are obtained by branching off the reception signals, as a learning block data to compute the lattice reflection coefficients, reference numeral 17 a lattice filter for receiving the reception signals to execute one stage of lattice processing, reference numeral $1b$ a second lattice reflection coefficient computing means for receiving the signals output from the lattice filter 17 to compute a second lattice reflection coefficients, and reference numeral 8 the frequency determination means for receiving two lattice reflection coefficients transferred from the two reflection coefficient computing means to estimate the Doppler central frequencies of clutter.

Assume here that the i-th range will be processed. The first reflection coefficient computing means $1a$ takes the data for the total (NL+NR) range out of the range from $i-\Delta R-NL$ to $i+\Delta R+NR$ from the reception signals and compute the lattice reflection coefficients in accordance with the formula 24b. It is assumed here that the number of hits is 3.

$$bx(n) = \quad (24a)$$

$$[X_{i-\Delta R-NL}(n), \ldots, X_{i-\Delta R+1}(n), X_{i+\Delta R+1}(n), \ldots, X_{i+\Delta R+NL}(n)]$$

$$\rho_i(1) = \quad (24b)$$

$$-2 \frac{\sum_{n=2}^{3} bx(n)^T \cdot bx(n-1)^*}{\sum_{n=2}^{3} \{bx(n)^T \cdot bx(n)^* + bx(n-1)^T \cdot bx(n-1)^*\}}$$

The lattice reflection coefficient $\rho_i(1)$ which has been generated is transferred to the lattice filter 17. In the lattice filter 17, operation exhibited in the following equations 25a, 25b and 25c is executed and the output signals are transferred to the second reflection coefficient computing means $1b$.

$$f_i(n) = b_i(n) = x_i(n) \quad (25a)$$

$$ff_i(n) = f_i(n) + \rho_i(n) \cdot b_i(n-1) \quad (25b)$$

$$bb_i(n) = b_i(n-1) + \rho_i(n)^* \cdot f_i(n) \quad (25c)$$

where n=2-3

In the second reflection coefficient computing means $1b$, the second lattice reflection coefficient $\rho_i(2)$ is generated by computing the following equation 26c by using said signals $ff_i(n)$, $bb_i(n)$.

$$bf(n) = \quad (26a)$$

$$[ff_{i-\Delta R-NL}(n), \ldots, ff_{i-\Delta R+1}(n), ff_{i+\Delta R+1}(n), \ldots, ff_{i+\Delta R+NL}(n)]$$

$$bb(n) = [bb_{i-\Delta R-NL}(n), \ldots, \quad (26b)$$

$$bb_{i-\Delta R+1}(n), bb_{i+\Delta R+1}(n), \ldots, bb_{i+\Delta R+NL}(n)]$$

$$\rho_i(2) = \quad (26c)$$

$$-2 \frac{\sum_{n=3}^{3} bf(n)^T \cdot bb(n-1)^*}{\sum_{n=3}^{3} \{bf(n)^T \cdot bf^*(n) + bb(n-1)^T \cdot bb^*(n-1)\}}$$

Figure 27:
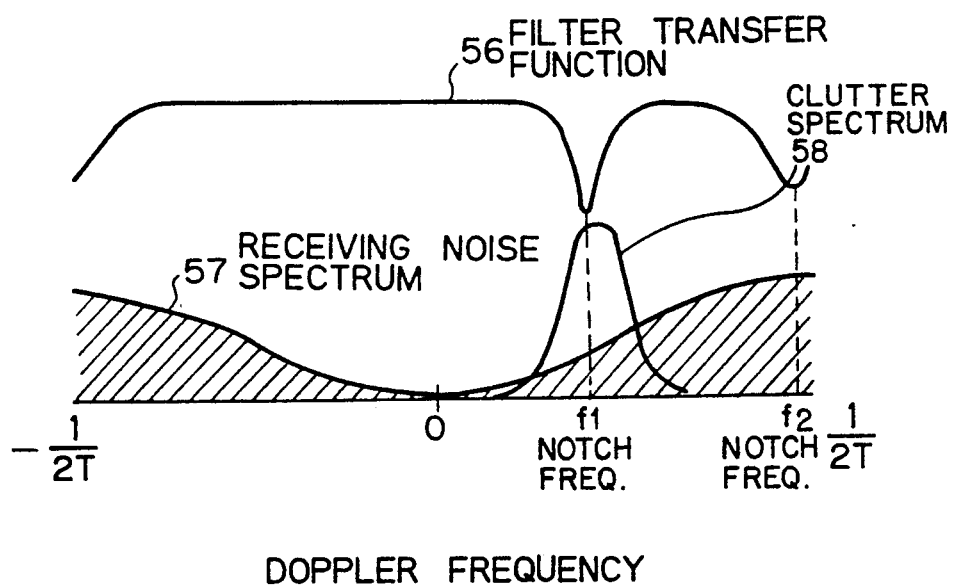
FIG. 27 illustrates a further frequency spectrum for explaining the operation of embodiment 6 of the present invention.
Figure 28:
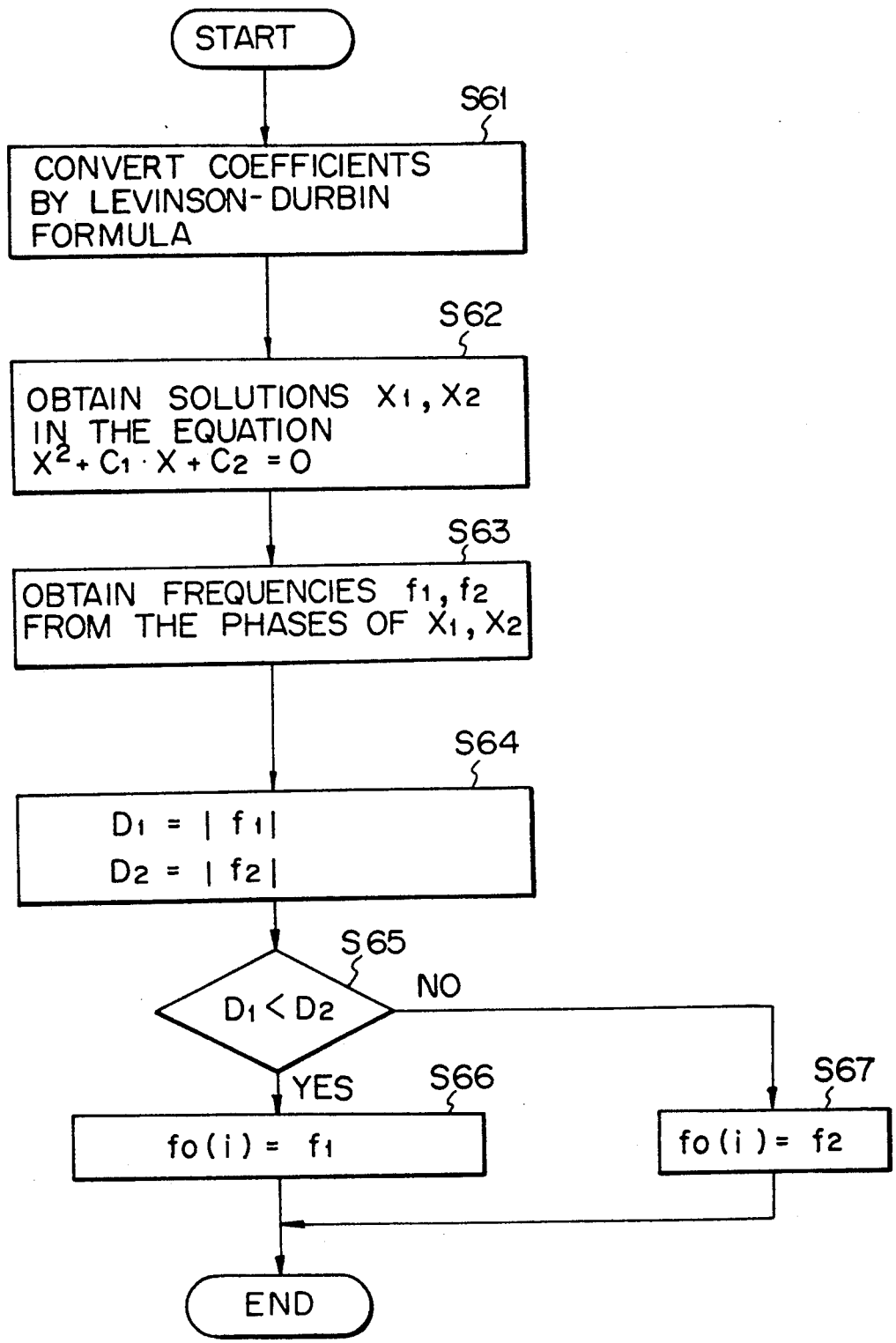
FIG. 28 is a flow chart for explaining the operation of a frequency determination means in embodiment 6 of the present invention.

By the processing as above described, two kinds of lattice reflection coefficients have been generated. These two kinds of lattice reflection coefficients are transferred to the frequency determination means 8. The amplitude characteristics of the lattice filters which are using these two kinds of lattice reflection coefficients are illustrated in FIG. 27. Lattice filters are capable of forming the number of notches corresponding to the number of connection stages of the lattice filters. In the case of the clutter being largely affected by the receiver noise which is the case under assumption here, one of the notches is formed for the receiver noise and another of the notches is formed for the clutter. By selecting the notch frequency corresponding to the clutter by searching the frequencies of two notches thus formed, the estimation error of the central frequency of the clutter caused by the receiver noise can be considerably mitigated. The manner of determining the frequency in the frequency determination means 8 will be explained as follows by referring to a flow chart in FIG. 28. Firstly, at step S61, computation is executed in accordance with the following equations 27a and 27b to obtain new complex coefficients $C_1$ and $C_2$.

$$C_1 = p_x(1) + p_x(2)p_x(1)^* \quad (27a)$$

$$c_2 = p_x(2) \quad (27b)$$

Next at step S62, computation is executed in accordance with the equations 28a and 28b so as to obtain the notch frequency.

$$X_1 = \frac{-C_1 - \sqrt{C_1^2 - 4C_2}}{2} \quad (28a)$$

$$X_2 = \frac{-C_1 + \sqrt{C_1^2 - 4C_2}}{2} \quad (28b)$$

By replacing I component and Q component of $X_i$ obtained at step S63 respectively with $Re[X_i]$ and $Im[X_i]$, the notch frequencies $f_1$ and $f_2$ are obtained by the equations 29a and 29b.

$$f_1 = \tan^{-1}\frac{Im[X_1]}{Re[X_1]} / 2\pi \quad (29a)$$

$$f_2 = \tan^{-1}\frac{Im[X_2]}{Re[X_2]} / 2\pi \quad (29b)$$

Then, the absolute values of the frequencies $f_1$, $f_2$ obtained at step S64 by the equations 29a, 29b are applied as $D_1$, $D_2$. As is seen from FIG. 27, the spectrum peak of the receiver noise composition which was subject to modulation by setting the notch frequency of the manual MTI at zero is located in the neighborhood of the normalized frequency of 0.5. In other words, since the notch frequency near the Doppler frequency of zero is the notch frequency corresponding to the clutter, at step S65, comparison is made between $D_1$ and $D_2$. If $D_1$ is smaller, this is the information corresponding to the clutter and $f_1$ is selected at step S66 as the estimated frequency. Conversely if $D_2$ is smaller, $f_2$ will be selected at step S67 as the estimated frequency.

In the above-mentioned embodiment, there has been described a clutter suppression device characterized in that the frequency estimation means comprises the first reflection coefficient computing means for receiving the reception signals to compute the first lattice reflection coefficients, a lattice filter adapted to process the reception signals by using the first lattice reflection coefficients transferred from the first reflection coefficient computing means, the second reflection coefficient computing means for receiving the signals transferred from the lattice filter to compute the second lattice reflection coefficients, and as estimated frequency determination means for receiving the first and second lattice reflection coefficients transferred from the first and second reflection coefficient computing means to estimate the Doppler central frequency of the clutter by using the phase of the first and second lattice reflection coefficients.

According to the embodiment 6, the lattice reflection coefficients are computed by inputting the reception signals, the reception signals are processed by the lattice filter by using the lattice reflection coefficients, the second lattice reflection coefficients are calculated from the processed signals, two notch frequencies are computed from two sets of lattice reflection coefficients mentioned above, and the absolute values of the two notch frequencies are compared to select the frequency corresponding to the clutter, whereby degradation of clutter suppression performance due to the affect by the modulated receiver noise over the reception signals pre-processed by the manual MTI can be mitigated.

Embodiment 7

This embodiment comprises the following elements so as to mitigate the median frequency estimation errors.

(a) A first maximum power detection means for receiving the reception signals to compute the power values for each range bin and transfer the range bin number corresponding to the range bin exhibiting the maximum power value, (b) A first lattice reflection coefficient computing means for receiving the reception signals and the range bin number transferred from the maximum power detection means to compute the reflection coefficients except the data corresponding to the range bin number, (c) A lattice filter adapted to process the reception signals by using the lattice reflection coefficients transferred from the lattice reflection coefficient computing means, (d) A second maximum power detection means for receiving the signals transferred from the lattice filter to compute the signal power value for each range bin and transfer another range bin number corresponding to the range bin which exhibits the maximum power value, (e) A second lattice reflection coefficient computing means for receiving the signals transferred from the lattice filter and the range bin number transferred from the second maximum power detection means and compute a second lattice reflection coefficients except the data corresponding to the another range bin number, (f) An estimated frequency determination means for receiving the first and second lattice reflection coefficients transferred from the first and second lattice reflection coefficient computing means to estimate the central frequency of the clutter from the phase term thereof, (g) A filter weight computing means adapted to compute the notch filter weight by using the notch filter coefficient designed in advance so as to obtain a desired clutter suppression performance, so that a notch of the notch filter may be formed in the range in which the clutter is present, and (h) A notch filter adapted to process the reception signals by using the filter weight values computed by the filter weight computing means.

The elements from (a) through (h) will now be explained with reference to FIG. 29.

Figure 29:
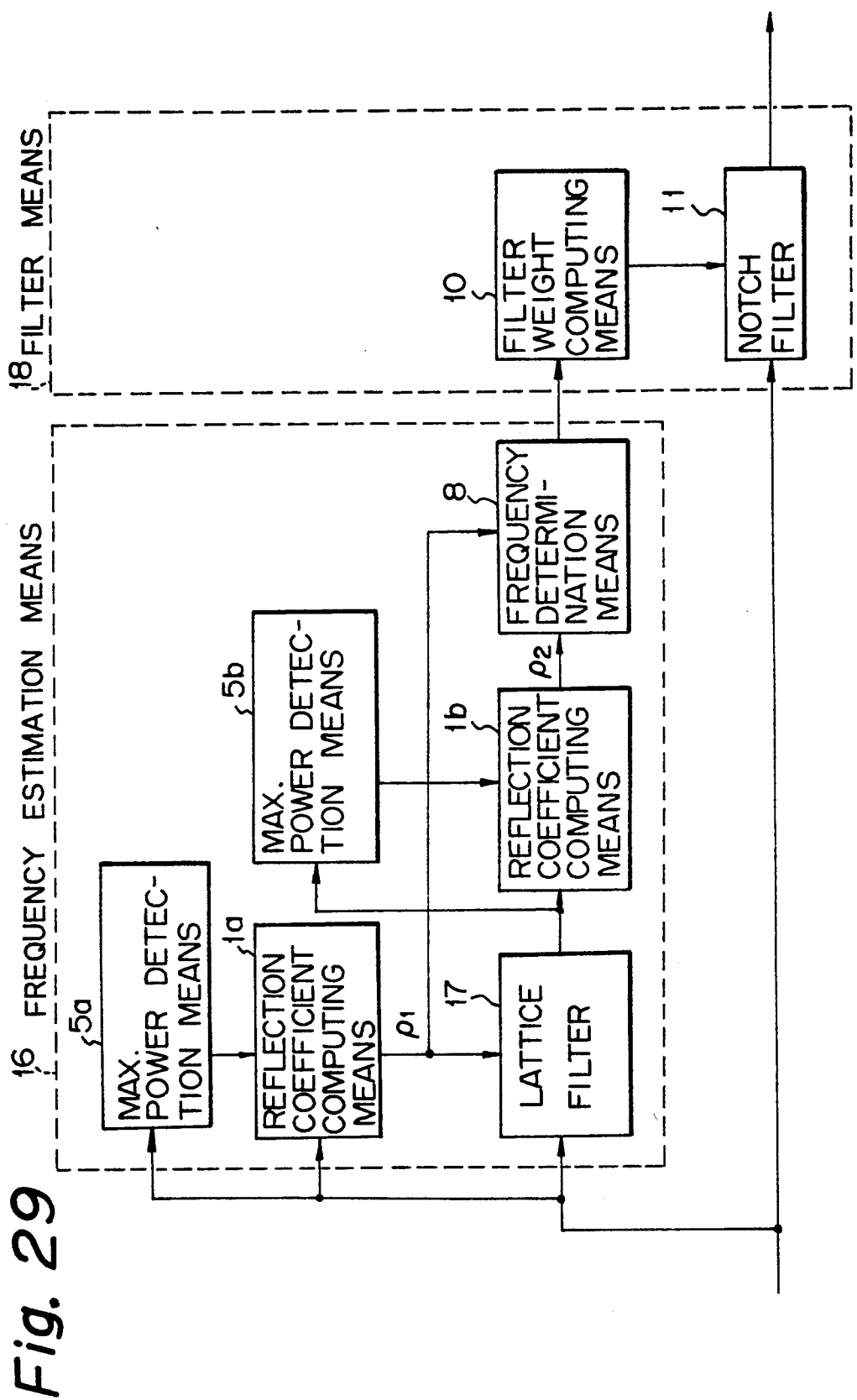
FIG. 29 illustrates a constitution of embodiment 7 according to the present invention.

In FIG. 29, identical elements to those employed in the prior art and the embodiments 1, 3, 4, and 6 are denoted with identical reference numerals and the explanation thereof is not repeated here.

In FIG. 29, reference numeral 5a designates the first maximum power detection means for receiving the reception signals to detect and output the range bin number which exhibits the maximum power, reference numeral 1a the first reflection coefficient computing means adapted to compute the first lattice reflection coefficients except the data corresponding to the range bin number transferred from the maximum power detection means 5a, reference numeral 5b the second maximum power detection means for receiving the signals processed by the lattice filter 17 to detect and output the range bin number which exhibits the maximum power, and reference numeral 1b the second reflection coefficient computing means adapted to compute the second lattice reflection coefficients except the data corresponding to the range bin number transferred from the second maximum power detection means 5b.

According to this embodiment, degradation of the clutter suppression performance in the vicinity of the target signal due to the affect by the target signal of the maximum power can be mitigated by computing the lattice reflection coefficients except the data corresponding to the range bin exhibiting the maximum power. Estimation error of the Doppler central frequency for the clutter due to the affect by the receiver noise component which was subject to modulation by the manual MTI mentioned above can be mitigated by estimating the central frequency of the clutter from two kinds of lattice reflection coefficients generated by providing two reflection coefficient computing means.

In the embodiment as above explained, there has been described a clutter suppression device characterized in that the frequency estimation means comprises the first maximum power detection means for receiving the reception signals to compute and compare the power value for each range bin and detect the range bin number which exhibits the maximum power value, the first reflection coefficient computing means for receiving the reception signals to compute the first reflection coefficients except the data corresponding to the range bin number transferred from the first maximum power detection means, a lattice filter adapted to process the reception signals by using the first lattice reflection coefficients transferred from the first reflection coefficient computing means, the second maximum power detection means for receiving the signals transferred from the lattice filter to compute and compare the power values for each range bin and detect the range bin number which exhibits the maximum power value, the second lattice reflection coefficient computing means adapted to compute the lattice reflection coefficients except the data corresponding to the range bin number transferred from the second maximum power detection means by using the signals transferred from the lattice filter, and an estimated frequency determination means for receiving the lattice reflection coefficients transferred from the first and second lattice reflection coefficient computing means and estimate the Doppler central frequency of the clutter by using the phase of the lattice reflection coefficients.

According to the embodiment 7, the range bin number which exhibits the maximum power is detected by inputting reception signals, the lattice reflection coefficients are computed except the data corresponding to said range bin number, the reception signals are processed by the lattice filter by using these lattice reflection coefficients, the range bin number exhibiting the maximum power is detected again in connection with the output signals of the processed reception signals, the lattice reflection coefficients are computed except the data corresponding to said range bin number, two notch frequencies are computed from these two sets of lattice reflection coefficients, and the absolute values of these notch frequencies are compared with each other to select the frequency corresponding to the clutter, whereby degradation of clutter suppression performance in the vicinity of the range bin including the target signal due to the affect by the target signal of a large power, as well as degradation of clutter suppression performance due to the affect of the modulated receiver noise over the reception signals pre-processed by the manual MTI can be mitigated.

Embodiment 8

This embodiment comprises the following elements in order to mitigate the central frequency estimation error:

(a) A first lattice reflection coefficient computing means for receiving the reception signals to compute the first lattice reflection coefficients for each range bin, (b) A first median filter for receiving a plurality of first lattice reflection coefficients transferred from the first reflection coefficient computing means to compute the median value of the first lattice reflection coefficients, (c) A lattice filter adapted to process the reception signals by using a plurality of lattice reflection coefficients transferred from the median filter, (d) A second lattice reflection coefficient computing means for receiving the data transferred from the lattice filter to compute the second lattice reflection coefficients for each range bin, (e) A second median filter for receiving a plurality of second lattice reflection coefficients transferred from the second lattice reflection coefficient computing means to transfer the median value thereof, (f) An estimated frequency determination means for receiving the lattice reflection coefficients transferred from the first and second median filters to estimate the central frequency of the clutter from the phase term of the first and second transferred lattice reflection coefficient, (g) A filter weight computing means adapted to compute the notch filter weight by using the notch filter coefficients designed in advance to obtain a desired clutter suppression performance so that the notch of a notch filter may be formed in the range in which the clutter is present, and (h) A notch filter adapted to process the reception signals by using the filter weight values computed by the filter weight computing means.

The elements from (a) through (h) will now be explained with reference to FIG. 30.

Figure 30:
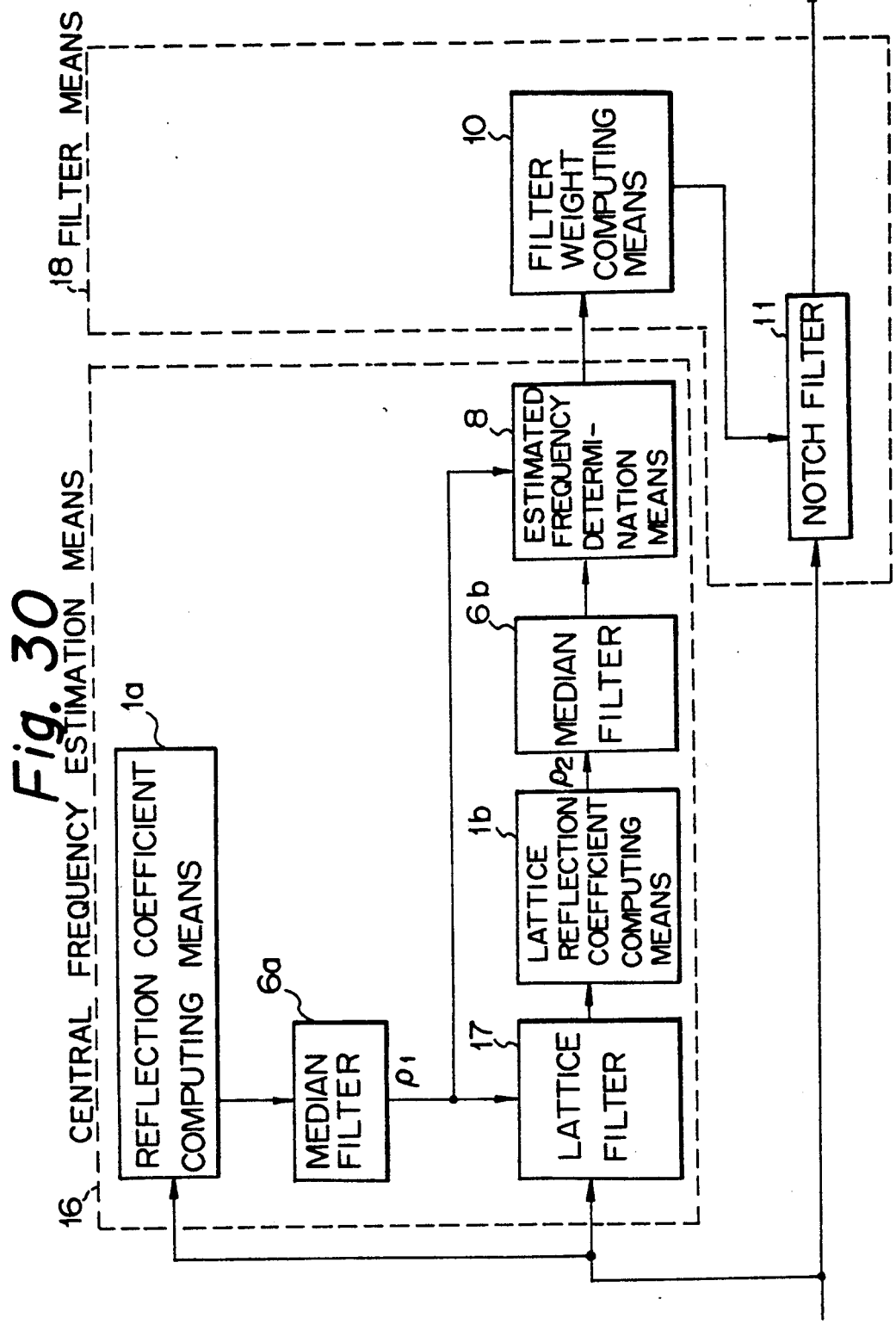
FIG. 30 illustrates a constitution of embodiment 8 according to the present invention.

In FIG. 30, identical elements to those employed in the prior art and the above-described embodiments 1 through 5 are denoted with identical reference numerals and the explanation thereof is not repeated.

In FIG. 30, reference numeral 1a designates the first reflection coefficient computing means for receiving signals which is obtained by branching off the reception signals to compute the first lattice reflection coefficient for each range bin, reference numeral 6a the first median filter for receiving the first lattice reflection coefficients transferred from the first reflection coefficient computing means 1a to compute the first median value thereof, reference numeral 1b the second lattice reflection coefficient computing means for receiving the signals processed by the lattice filter 17 to compute the second lattice reflection coefficient for each range bin, and reference numeral 6b the second median filter for receiving a plurality of lattice reflection coefficients transferred from the second reflection coefficient computing means 1b to compute the second median value thereof and transfer it to the estimated frequency determination means 8.

According to this embodiment, degradation of the clutter suppression performance in the vicinity of the target signal range bin due to the target signal of a large power may be mitigated by using the median value of the lattice reflection coefficients, and an estimation error of the Doppler central frequency of the clutter due to the effect of the receiver noise component which was subjected to the manual MTI may also be mitigated by providing two lattice reflection coefficient computing means, and estimating the central frequency of the clutter in accordance with two kinds of lattice reflection coefficients generated by the two lattice reflection coefficient computing means.

In the above-mentioned embodiment, there has been described a clutter suppression device characterized in that a frequency estimation means comprises a first lattice reflection coefficient computing means for receiving the reception signals to compute the lattice reflection coefficients for each range bin, a first median filter for receiving a plurality of lattice reflection coefficients transferred from the lattice reflection coefficient computing means to compute the median value of the plurality of lattice reflection coefficients, a lattice filter adapted to process the reception signals by using the lattice reflection coefficients transferred from the first median filter, a second lattice reflection coefficient computing means for receiving the signals transferred from the lattice filter to compute the lattice reflection coefficients, a second median filter for receiving a plurality of lattice reflection coefficients transferred from the second lattice reflection coefficient computing means to compute the median value of the plurality of lattice reflection coefficients, and an estimated frequency determination means for receiving the lattice reflection coefficients respectively transferred from the first and second median filters to estimate the Doppler central frequency of the clutter by using the phases of the lattice reflection coefficients transferred from the first and second median filters.

According to the embodiment 8, the lattice reflection coefficients are computed for each range bin by inputting the reception signals, the median value of a plurality of generated lattice reflection coefficients is computed by the median filter, the reception signals are processed by the lattice filter by using these lattice reflection coefficients, the lattice reflection coefficients are computed again for each range bin in connection with the output signal generated by processing reception signals, the median value of a plurality of the generated lattice reflection coefficients is computed by the median filter, two notch frequencies are computed in accordance with these two sets of lattice reflection coefficients and the absolute values of these notch frequencies are compared with each other to select the frequency corresponding to the clutter, whereby degradation of clutter suppression performance in the vicinity of the range bin including the target signal due to the affect by the target signal of a large power, as well as degradation of clutter suppression performance due to the effect by the modulated receiver noise over the reception signals pre-processed by the manual MTI can be mitigated.

It is to be understood that in the embodiments from 6 through 8, although each one of the reflection coefficient computing means and the lattice filters are added to the constructions of the embodiments 3 through 5, respectively, each (N−1) number of such means may be added to attain similar effects if N-dimensional equation can be solved in the estimated frequency determination means.

The present invention has been described in detail with reference to certain preferred embodiments thereof, but it will be understood that variations and modifications can be effected within the spirit and scope of the invention.

For example, in the foregoing embodiments, clutters were described as to be suppressed, but the unwanted signal suppression device according to the present invention may be applied for purposes for generally suppressing unwanted signals from the input signals.

What is claimed is:

1. An unwanted signal suppression device for suppressing unwanted signals from input signals which include desired signals and the unwanted signals, comprising:

a power detection means for sampling the input signals at specified time intervals, each sample being a signal segment, said power detection means having means for detecting the signal segment which exhibits at least the maximum power and having means for providing a maximum power segment signal which indicates the signal segment which exhibits the maximum power, a reflection coefficient computing means for computing reflection coefficients, said reflection coefficient computing means receiving the maximum power segment signal, said reflection coefficient computing means computing the reflection coefficients based on the signal segments except for the signal segment corresponding to the maximum power segment signal, and a lattice filter for suppressing said unwanted signals and for generating said desired signals, said lattice filter receiving said reflection coefficients and said input signals.

2. An unwanted signal suppression device for suppressing unwanted signals from input signals which include desired signals and the unwanted signals, comprising:

a reflection coefficient computing means for sampling the input signals at specified time intervals, each sample being a signal segment, the reflection coefficient computing means having means for computing reflection coefficients for each signal segment, a median filter means for receiving the reflection coefficients and for determining a median reflection coefficient, the median reflection coefficient being a median value of the reflection coefficients, said median filter means having means for outputting the median reflection coefficient, and a lattice filter, receiving the median reflection coefficient and said input signals, said lattice filter suppressing said unwanted signals and outputting the desired signals.

3. An unwanted signal suppression device for suppressing unwanted signals from input signals which include desired signals and the unwanted signals, comprising:

an unwanted signal frequency estimation means for estimating a frequency of said unwanted signals, said unwanted signal frequency estimation means receiving said input signals and having means for outputting an estimate signal which is indicative of the frequency estimate for the unwanted signals, said estimate signal determined on the basis of said input signals, and a filter means for computing a filter weight, said filter means receiving said estimate signal, said filter means computing a filter weight based upon the estimate signal and filter coefficients exhibiting a desired amplitude characteristic, said filter means having means for applying said filter weight to a notch filter which receives said input signals, said notch filter suppressing said unwanted signals and outputting said desired signals.

4. The unwanted signal suppression device of claim 3, wherein said unwanted signal frequency estimation means comprises a reflection coefficient computing means for computing the reflection coefficients on the basis of said input signals, said reflection coefficient computing means providing reflection coefficients and wherein said unwanted signal frequency estimation means further comprises an unwanted signal frequency determination means for determining the frequency of said unwanted signals, said unwanted signal frequency determination means receiving said reflection coefficient and having means for determining the frequency of said unwanted signals based on said reflection coefficients.

5. The unwanted signal suppression device of claim 3, wherein said filter means comprises a filter weight computing means for computing the filter weight on the basis of said estimate signal and the filter coefficient exhibiting a desired amplitude characteristic.

6. The unwanted signal suppression device of claim 3, wherein
said unwanted signal frequency estimation means comprises a power detection means for sampling the input signals at specified time intervals, each sample being a signal segment, said power detection means having means for detecting the signal segment which exhibits at least the maximum power, a reflection coefficient computing means for computing the reflection coefficients on the basis of the remaining signal segments excluding said detected signal segment exhibiting the maximum power, and an unwanted signal frequency determination means for determining the frequency of said unwanted signals on the basis of said computed reflection coefficients.

7. The unwanted signal suppression device of claim 3, wherein said unwanted signal frequency estimation means comprises a reflection coefficient computing means for sampling the input signals at specified time intervals, each sample being a signal segment, the reflection coefficient computing means having means for computing reflection coefficients for each signal segment, a median filter for outputting a median reflection coefficient out of said reflection coefficients, and an unwanted signal frequency determination means for determining the frequency of said unwanted signals on the basis of the median reflection coefficient output from said median filter.

8. The unwanted signal suppression device of claim 3, wherein
said unwanted signal frequency estimation means comprises a first reflection coefficient computing means sampling the input signals at specified time intervals, each sample being a signal segment, the reflection coefficient computing means having means for computing reflection coefficients for each signal segment, a lattice filter for processing said input signals so as to reduce the unwanted signals on the basis of said computed first reflection coefficients, a second reflection coefficient computing means for computing second reflection coefficients for each of the signal segments produced by sampling the signals from said lattice filter by said specified time intervals, and an unwanted frequency determination means for determining the frequency of said unwanted signals on the basis of said computed first and second reflection coefficients.

9. An unwanted signal suppression device for suppressing unwanted signals from input signals which include desired signals and the unwanted signals, comprising:
a maximum power detector, which samples the input signals at specified time intervals, each sample being a signal segment, and which detects the signal segment which exhibits at least the maximum power and which provides as an output a maximum power segment signal, which indicates the signal segment that exhibits the maximum power,
a reflection coefficient computer, which receives the maximum power segment signal, and which computes the reflection coefficients based upon the received signal segments except for the signal segment corresponding to the maximum power segment signal, and
a lattice filter, which receives the reflection coefficients and the input signals and which suppresses said unwanted signals.

10. An unwanted signal suppression device for suppressing unwanted signals from input signals which include desired signals and the unwanted signals, comprising:
a reflection coefficient computer, which samples the input signals at specified time intervals, each sample being a signal segment, and which computes reflection coefficients for each signal segment,
a median filter, which receives the reflection coefficients and which outputs a median reflection coefficient that is a median value of the reflection coefficients, and
a lattice filter, which receives the median reflection coefficient and the input signals and which suppresses the unwanted signals and outputs the desired signals.

11. An unwanted signal suppression device for suppressing unwanted signals from input signals which include desired signals and the unwanted signals, comprising:
an unwanted signal frequency estimator, which receives the input signals and which determines a frequency estimate of the unwanted signal based upon the input signals and which provides an estimate signal that is indicative of the frequency estimate, and
a filter, which receives the estimate signal and which has a filter weight computer that determines a filter weight based upon the estimate signal and filter coefficients, which exhibit a desired amplitude characteristic, wherein the filter uses the filter weight to suppress the unwanted signals and output the desired signals.

12. In a system receiving input signals that include desired signals and unwanted signals, a method of suppressing the unwanted signals, comprising the steps of:
dividing the input signals into signal segments, corresponding to specified time intervals,
detecting the signal segment which exhibits at least the maximum power, and computing reflection coefficients based upon all signal segments except for the signal segment exhibiting at least the maximum power and applying the reflection coefficients to a filter to suppress the unwanted signals.

13. In a system receiving input signals that include desired signals and unwanted signals, a method of suppressing the unwanted signals, comprising the steps of:
dividing the input signals into signal segments, corresponding to specified time intervals,
computing reflection coefficients based upon the input signals, and
determining a median value reflection coefficient from the computed reflection coefficients and applying the median value reflection coefficient to a filter to suppress the unwanted signals.

14. In a system receiving input signals that include desired signals and unwanted signals, a method of suppressing the unwanted signals, comprising the steps of:
dividing the input signals into signal segments, corresponding to specified time intervals,
computing reflection coefficients based upon all signal segments except for the signal segment that exhibits at least the maximum power.

* * * * *